US007818269B2

(12) United States Patent
Ogg et al.

(10) Patent No.: US 7,818,269 B2

(45) Date of Patent: Oct. 19, 2010

(54) COMPUTER POSTAGE AND MAILING TRACKING LABELS

(75) Inventors: Craig L. Ogg, Long Beach, CA (US); Daniel King Cowles, Irvine, CA (US); Akbar A. Thobhani, Santa Monica, CA (US)

(73) Assignee: Stamps.com Inc., Los Angeles, CA (US)

(*) Notice: Subject to any disclaimer, the term of this patent is extended or adjusted under 35 U.S.C. 154(b) by 925 days.

(21) Appl. No.: 10/731,992

(22) Filed: Dec. 8, 2003

(65) Prior Publication Data

US 2005/0125367 A1 Jun. 9, 2005

(51) Int. Cl.
*G06F 17/00* (2006.01)

(52) U.S. Cl. .................................................... 705/408

(58) Field of Classification Search ....................... None
See application file for complete search history.

(56) References Cited

U.S. PATENT DOCUMENTS

| | | | | |
|---|---|---|---|---|
| 4,872,706 | A | 10/1989 | Brewen et al. | |
| 5,262,623 | A * | 11/1993 | Batterman et al. | 235/454 |
| 5,449,200 | A | 9/1995 | Andric | |
| 5,510,992 | A | 4/1996 | Kara | |
| 5,573,277 | A * | 11/1996 | Petkovsek | 283/79 |
| 5,612,889 | A | 3/1997 | Pintsov et al. | |
| 5,626,286 | A | 5/1997 | Petkovsek | |
| 5,682,318 | A | 10/1997 | Kara | |
| 5,717,597 | A | 2/1998 | Kara | |
| 5,737,729 | A | 4/1998 | Denman | |
| 5,801,944 | A | 9/1998 | Kara | |
| 5,812,991 | A | 9/1998 | Kara | |
| 5,848,401 | A | 12/1998 | Goldberg | |
| 5,923,406 | A | 7/1999 | Brasington et al. | |
| 5,944,461 | A * | 8/1999 | Kanbar | 705/408 |
| 5,995,985 | A | 11/1999 | Cai | |
| 6,010,156 | A * | 1/2000 | Block | 281/2 |
| 6,108,643 | A | 8/2000 | Sansone | |
| 6,192,165 | B1 | 2/2001 | Irons | |
| 6,208,980 | B1 | 3/2001 | Kara | |
| 6,209,920 | B1 | 4/2001 | Fabel | |
| 6,244,763 | B1 * | 6/2001 | Miller | 400/76 |
| 6,296,404 | B1 * | 10/2001 | Pierce et al. | 400/62 |
| 6,415,983 | B1 | 7/2002 | Ulver et al. | |
| 6,419,782 | B1 * | 7/2002 | Johnson et al. | 156/277 |

(Continued)

FOREIGN PATENT DOCUMENTS

| | | |
|---|---|---|
| JP | 2005215905 | 8/2005 |

(Continued)

OTHER PUBLICATIONS

"Need more trackits?", trackmymail.com, Dec. 8, 2003.*

(Continued)

*Primary Examiner*—John W Hayes
*Assistant Examiner*—Rob Wu
(74) *Attorney, Agent, or Firm*—Khorsandi Patent Law Group, A Law Corp.; Marilyn R. Khorsandi

(57) ABSTRACT

The present invention provides special purpose label arrangement sets for use with computer-based postage systems to facilitate mailing tracking, sheets of such label arrangement sets, and methods for printing such label arrangement sets.

19 Claims, 18 Drawing Sheets

U.S. PATENT DOCUMENTS

| | | | | |
|---|---|---|---|---|
| 6,424,954 | B1 | 7/2002 | Leon | |
| 6,427,021 | B1 | 7/2002 | Fischer et al. | |
| 6,461,063 | B1 | 10/2002 | Miller et al. | |
| 6,505,179 | B1 | 1/2003 | Kara | |
| 6,505,980 | B1 | 1/2003 | Allday | |
| 6,557,755 | B1 * | 5/2003 | Pickering et al. | 235/376 |
| 6,592,027 | B2 | 7/2003 | Kovlakas | |
| 6,594,374 | B1 * | 7/2003 | Beckstrom et al. | 382/101 |
| 6,655,579 | B1 | 12/2003 | Delman et al. | |
| 6,687,684 | B1 * | 2/2004 | Whitehouse et al. | 705/408 |
| 6,701,304 | B2 | 3/2004 | Leon | |
| 6,722,563 | B1 * | 4/2004 | Johnson et al. | 235/375 |
| 6,722,565 | B2 * | 4/2004 | Takeuchi et al. | 235/454 |
| 6,735,575 | B1 | 5/2004 | Kara | |
| 6,820,201 | B1 | 11/2004 | Lincoln et al. | |
| 6,834,273 | B1 | 12/2004 | Sansone et al. | |
| 7,069,253 | B2 | 6/2006 | Leon | |
| 7,085,725 | B1 | 8/2006 | Leon | |
| 7,117,363 | B2 | 10/2006 | Lincoln et al. | |
| 7,149,726 | B1 | 12/2006 | Lingle et al. | |
| 7,162,460 | B2 | 1/2007 | Cleckler et al. | |
| 7,191,158 | B2 | 3/2007 | Ogg et al. | |
| 7,194,957 | B1 | 3/2007 | Leon et al. | |
| 7,243,842 | B1 | 7/2007 | Leon et al. | |
| 2001/0042052 | A1 | 11/2001 | Leon | |
| 2002/0023057 | A1 | 2/2002 | Goodwin et al. | |
| 2002/0033598 | A1 | 3/2002 | Beasley | |
| 2002/0046195 | A1 | 4/2002 | Martin et al. | |
| 2002/0051205 | A1 * | 5/2002 | Teranishi et al. | 358/1.18 |
| 2002/0073039 | A1 | 6/2002 | Ogg et al. | |
| 2002/0083020 | A1 | 6/2002 | Leon | |
| 2002/0083021 | A1 | 6/2002 | Ryan, Jr. et al. | |
| 2003/0037008 | A1 | 2/2003 | Raju | |
| 2003/0046103 | A1 * | 3/2003 | Amato et al. | 705/1 |
| 2003/0089765 | A1 | 5/2003 | Kovlakas | |
| 2003/0101143 | A1 | 5/2003 | Montgomery et al. | |
| 2003/0101147 | A1 | 5/2003 | Montgomery et al. | |
| 2003/0101148 | A1 * | 5/2003 | Montgomery et al. | 705/404 |
| 2003/0140017 | A1 | 7/2003 | Patton et al. | |
| 2003/0217017 | A1 * | 11/2003 | Willoughby et al. | 705/404 |
| 2004/0044586 | A1 | 3/2004 | Gullo et al. | |
| 2004/0215478 | A1 | 10/2004 | Baker et al. | |
| 2005/0065892 | A1 | 3/2005 | Ryan et al. | |
| 2005/0065897 | A1 | 3/2005 | Ryan et al. | |
| 2005/0144145 | A1 | 6/2005 | Ogg et al. | |
| 2005/0195214 | A1 * | 9/2005 | Reid et al. | 345/611 |
| 2006/0020505 | A1 | 1/2006 | Whitehouse | |
| 2006/0041519 | A1 | 2/2006 | Ogg et al. | |
| 2007/0100672 | A1 | 5/2007 | McBride et al. | |
| 2008/0007625 | A1 * | 1/2008 | Reid et al. | 348/207.99 |

FOREIGN PATENT DOCUMENTS

| | | |
|---|---|---|
| WO | WO 00/49580 | 8/2000 |

OTHER PUBLICATIONS

STAMPS.COM Inc., Santa Monica, CA 90405, Stamps.com 3-Part Multi-Purpose Labels SDC-3100, 1 p.

STAMPS.COM Inc., Santa Monica, CA 90405, Stamps.com 2-Part Window Envelope Labels SDC-2300, 1 p.

TRACKMYMAIL.COM, Gaithersburg, MD 20879, Commercial paper advertising trackmymail.com, 4 pp.

TRACKMYMAIL.COM, Gaithersburg, MD 20879, Pages printed from www.trackmymail.com website, 18 pp.

United States Patent Office; Office Action dated Mar. 9, 2007 for Ogg et al.; Outbound Mail Piece Tracking; U.S. Appl. No. 10/747,936, filed Dec. 29, 2003.

United States Patent Office; Office Action dated Feb. 26, 2008 for Ogg et al.; Outbound Mail Piece Tracking; U.S. Appl. No. 10/747,936, filed Dec. 29, 2003.

United States Patent Office; Office Action dated Nov. 19, 2007 for Ogg et al.; Automated Handling of Computer-Based Postage System Printing Errors; U.S. Appl. No. 10/922,334, filed Aug. 20, 2004.

United States Patent Office; Office Action dated Nov. 8, 2005 for Raju et al.; Generic Value Bearing Item Labels; U.S. Appl. No. 10/197,044, filed Jul. 16, 2002.

United States Patent Office; Office Action dated Apr. 25, 2006 for Raju et al.; Generic Value Bearing Item Labels; U.S. Appl. No. 10/197,044, filed Jul. 16, 2002.

United States Patent Office; Office Action dated Aug. 11, 2006 for Raju et al.; Generic Value Bearing Item Labels; U.S. Appl. No. 10/197,044, filed Jul. 16, 2002.

United States Patent Office; Office Action dated Feb. 15, 2007 for Raju et al.; Generic Value Bearing Item Labels; U.S. Appl. No. 10/197,044, filed Jul. 16, 2002.

United States Patent Office; Office Action dated Aug. 17, 2007 for Raju et al.; Generic Value Bearing Item Labels; U.S. Appl. No. 10/197,044, filed Jul. 16, 2002.

United States Patent Office; Office Action dated Dec. 13, 2007 for Raju et al.; Generic Value Bearing Item Labels; U.S. Appl. No. 10/197,044, filed Jul. 16, 2002.

United States Patent Office; Notice of Allowance dated Jun. 19, 2008 for Raju et al.; Generic Value Bearing Item Labels; U.S. Appl. No. 10/197,044, filed Jul. 16, 2002.

United States Patent Office; Office Action dated Dec. 14, 2004, for Raju et al.; System and Methods for Providing Computer-Based Postage Stamps; U.S. Appl. No. 09/975,532, filed Oct. 10, 2001.

United States Patent Office; Notice of Allowance dated May 16, 2005, for Raju et al.; System and Methods for Providing Computer-Based Postage Stamps; U.S. Appl. No. 09/975,532, filed Oct. 10, 2001.

United States Patent Office; Notice of Withdrawal From Issue dated Nov. 30, 2005, for Raju et al.; System and Methods for Providing Computer-Based Postage Stamps; U.S. Appl. No. 09/975,532, filed Oct. 10, 2001.

United States Patent Office; Office Action dated Apr. 12, 2006, for Raju et al.; System and Methods for Providing Computer-Based Postage Stamps; U.S. Appl. No. 09/975,532, filed Oct. 10, 2001.

United States Patent Office; Notice of Allowance dated Sep. 6, 2006, for Raju et al.; System and Methods for Providing Computer-Based Postage Stamps; U.S. Appl. No. 09/975,532, filed Oct. 10, 2001.

United States Patent Office; Office Action dated Sep. 18, 2008 for Ogg et al.; Outbound Mail Piece Tracking; U.S. Appl. No. 10/747,936, filed Dec. 29, 2003.

United States Patent Office; Notice of Allowance dated Sep. 5, 2006 for Cleckler et al; Media Type Identification; U.S. Appl. No. 10/688,548, filed Dec. 8, 2003.

United States Patent Office; Notice of Allowance dated Jan. 5, 2007 for Huebner et al.; Computer-Based Value-Bearing Item Customization Security; U.S. Appl. No. 10/994,768, filed Nov. 22, 2004.

United States Patent Office; Notice of Allowance dated Jul. 15, 2008 for Mc Bride et al.; Formatting Value-Bearing Item Indicia; U.S. Appl. No. 11/635,871, filed Dec. 8, 2006.

Canada Post Corporation; "Collecting—Picture Postage", 3 pages, © 2004, http://www.canadapost.ca/personal/collecting/default-e.asp?stamp=postage.

Personal Postage Corporation; "Personal Postage", 1 page, Undated, http://www.personalpostage.com, Printed Jul. 20, 2004.

Personal Postage Corporation; "Personal Postage", 2 pages, Undated, http://www.personalpostage.com/home.htm, printed Jul. 20, 2004.

Canada Post International, LLC; "Personal Postage", 2 pages, Undated, http://www.personalpostage.com/Canada%20Post.htm, printed Jul. 20, 2004.

Personal Postage Corporation; "Quick Reference Guide"; 8 pages; Undated; http://www.personalpostage.com/Om_page1.htm, page2.htm, page3.htm, page4.htm, printed Jul. 20, 2004.

Avery Dennison Corporation; "Avery Creative Postage Labels", 4 pages, http://www.creativepostagelabels.avery.com/postage_aap.html; © 1996-2004.

Avery Dennison Corporation; "Avery Creative Postage Labels", 2 pages, http://www.creativepostagelabels.avery.com/order.php; © 1996-2004.

Canadian Post; picture stamp sample, undated, prior to Jul. 27, 2004, 1 page.
Canadian Post; Set of pictures and address labels; sample, undated, prior to Jul. 27, 2004, 1 page.
"It's in the mail: a personalized postcode for life", an article about Royal Mail picture stamps, date unknown (prior to Jul. 27, 2004), publication unknown, 1 page.
Australian Post sample; Jul. 7-16, 2000; Anaheim, CA, 1 page.
Watson, Neva, "Changes to the Domestic Mail Manual to Implement Confirm®—Service," 67 FR 53454, Aug. 15, 2002.
Notice of Allowance for co-pending case U.S. Appl. No. 10/197,044, dated Nov. 24, 2008, pp. 1-10, USPTO.
Office Action for co-pending case U.S. Appl. No. 10/747,936, dated Sep. 18, 2008, pp. 1-39, USPTO.
Office Action for co-pending case U.S. Appl. No. 10/747,936, dated Apr. 13, 2009, pp. 1-52, USPTO.
Office Action for co-pending case U.S. Appl. No. 10/922,334, dated Oct. 28, 2008, pp. 1-20, USPTO.
Office Action for co-pending case U.S. Appl. No. 10/922,334, dated Apr. 23, 2009, pp. 1-20, USPTO.
Notice of Allowance for co-pending case U.S. Appl. No. 11/635,871, dated Nov. 17, 2008, pp. 1-12, USPTO.
JP Leon, U.S. Appl. No. 12/316,542, filed Dec. 11, 2008, Specification pp. 1-58, Figures 1-16.
Office Action for U.S. Appl. No. 10/747,936; pp. 1-42, dated Aug. 18, 2009, USPTO.
"Need more trackits?", 4 pages, http://www.trackmymail.com, 8341 Beechcraft Ave., Gaithersburg, MD 20879, 888-444-9972 or 310-924-2373, not dated.
"Direct Mail Tracking Online, Real-Time At Your Fingertips", 18 pages, http://www.trackmymail.com/, printed Dec. 3, 2003.
Endicia Internet Postage, 3 pages, http://www.endicia.com/, printed Dec. 29, 2003.

* cited by examiner

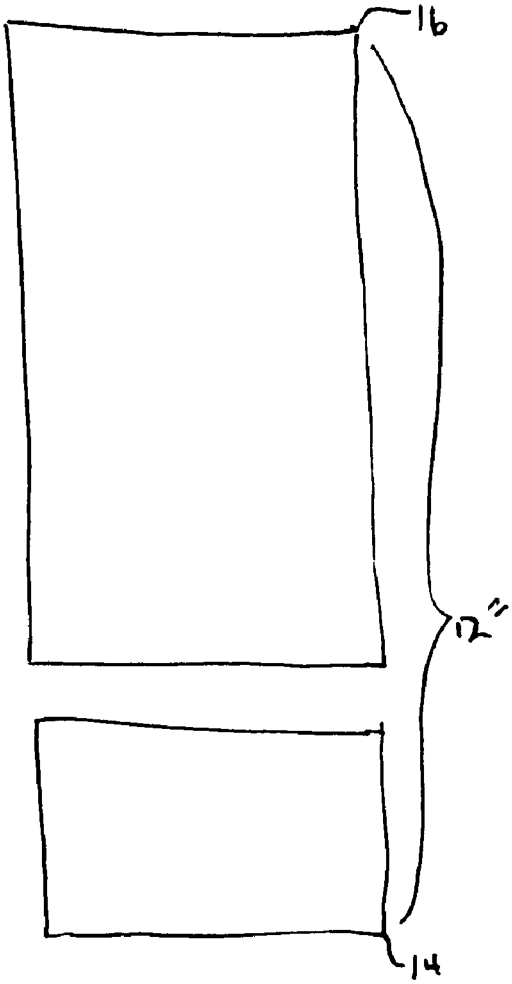
FiG. 4
FiG. 5
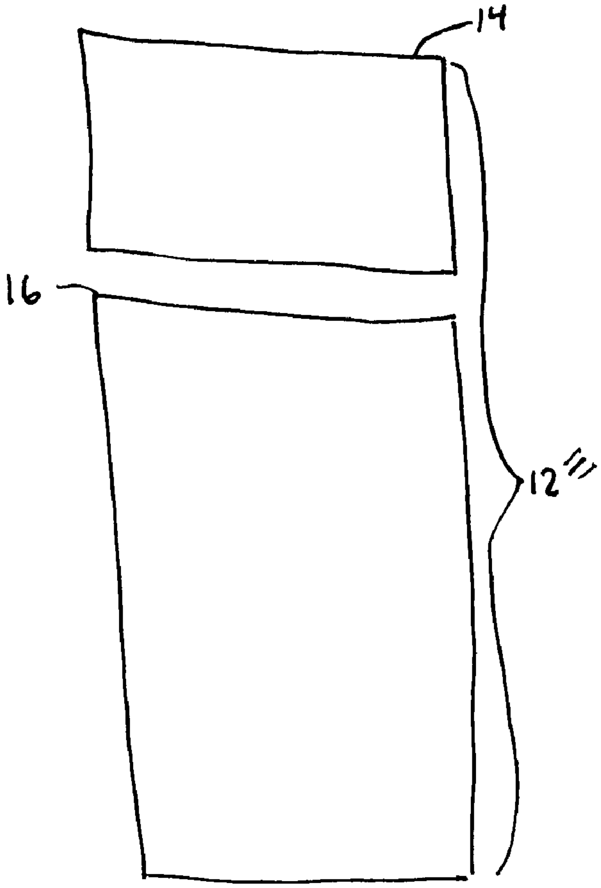

COMPUTER POSTAGE AND MAILING TRACKING LABELS

CROSS REFERENCE TO RELATED APPLICATIONS

This application is related to: U.S. patent application Ser. No. 09/975,532, filed Oct. 10, 2001, entitled "SYSTEM AND METHOD FOR PROVIDING COMPUTER-BASED POSTAGE STAMPS," which claims the benefit of U.S. Provisional Application No. 60/239,424, filed Oct. 10, 2000, entitled "A SYSTEM AND METHOD FOR PROVIDING COMPUTER BASED POSTAGE STAMPS"; U.S. patent application Ser. No. 09/905,329, filed Jul. 13, 2001, entitled "WEB-ENABLED VALUE BEARING ITEM PRINTING"; U.S. patent application Ser. No. 09/585,025, filed Jun. 1, 2000 and entitled "ON-LINE VALUE BEARING ITEM PRINTING"; and U.S. patent application Ser. No. 10/197,044, entitled "GENERIC VALUE BEARING ITEM LABELS", filed Jul. 16, 2002, all of which have been, or will be, commonly assigned, the entire contents and disclosures of all of which are hereby incorporated by reference for all purposes as if fully set forth herein.

FIELD OF THE INVENTION

The field of the present invention is labels, and more particularly, a special purpose label arrangement for use with Mail Piece Tracking.

BACKGROUND OF THE INVENTION

CONFIRM® service is a product offered by the United States Postal Service (USPS). U.S. Postal Service *Publication* 197 ("*Publication* 197") describes in detail various aspects of the CONFIRM® service and CONFIRM® service interfaces; *Publication* 197 is incorporated by reference in full herein for all purposes as if fully stated herein.

CONFIRM® is a mail tracking service of PLANET™ Codes that provides electronic tracking information to USPS customers about their First-Class, Standard letter-size, flat mail and periodicals. CONFIRM® provides advance delivery information about incoming hard-copy reply mail ("Origin CONFIRM") and outbound mail ("Destination CONFIRM").

In order to track mail, CONFIRM® uses a combination of two tracking numbers: a 5- or 11-digit POSTNET (POStal Numeric Encoding Technique) Code and a 12- or 14-digit PLANET™ Code. The POSTNET and PLANET™ Codes must be encoded as a barcode and applied to the mail piece.

As each mail piece progresses through to its destination, the CONFIRM® barcode on each mail piece is scanned at the different USPS processing facilities through which it passes. Electronic information for each scan is captured and is sent to a centralized network service, which collects the scan data and packages it for use by USPS customers. The electronic scan information is then electronically transferred from the centralized network and is made available in two ways: through accessing a PLANET™ Codes website or via transmission of electronic files sent to subscribing USPS customers.

A POSTNET Code identifies a particular delivery address. A PLANET™ Code identifies a particular CONFIRM® Subscriber's mailing.

The United States Postal Service (USPS) provides the Information Based Indicia Program (IBIP.) The IBIP facilitates PC-based (Personal Computer based) Postage, also sometimes referred to as computer-based, or Internet-based, Postage. With PC Postage, a user can purchase postage credit, and print the postage in the form of PC Postage onto a label or directly onto a mail piece. A PC Postage label provides a human-readable portion and a 2-dimensional barcode portion. The human-readable portion includes the postage value, mail class, the date, and optionally a logo. The barcode portion is intended to help thwart fraud, and includes information about the mail piece including the destination ZIP code, the amount of postage applied, the date and time the postage was applied, and a digital signature so that the USPS can validate the authenticity of the postage.

In one exemplary embodiment of PC Postage, a user subscribes to a third party Internet postage provider, such as, for example, Stamps.com (of Santa Monica, Calif.), and by using postage software made available by the Internet postage provider, postage value can be downloaded to the user's computer. The user can then print the postage indicia, by an ordinary laser or ink jet printer, directly onto the mail piece itself (e.g., onto business envelopes), onto a label to be applied to the mail piece, or alternately on an insert that can be placed into a window envelope so that it will show through a window envelope. Such postage software preferably works in conjunction with other software programs, such as word processing, accounting, database, and contact management software to allow a user to conveniently print PC Postage at the same time that addressee and bar code information is printed, and, in some cases of envelope printing, at the same time as the sender's return address is printed.

An example of a computer-based postage system is a software-based, online postage system described in U.S. patent application Ser. No. 09/163,993 filed on Sep. 29, 1998, by Mohan Ananda, entitled "On Line Postage System," the contents of which are hereby incorporated by reference as if set forth in full. The online postage system software comprises user code, also sometimes referred to as client software, that resides on a client system, and controller code, also sometimes referred to as server software, that resides on a server system. An exemplary on-line postage system may comprise a user system electronically connected to a server system, which in turn is connected to a USPS system. The server system is preferably capable of communicating with one or more client systems simultaneously.

In order to facilitate mail handling and optical reading equipment processing of mail by the USPS and to properly interpret PC Postage, addressee information, and CONFIRM® tracking information, postage indicia and related labels need to be applied according to USPS guidelines. USPS guidelines directed to the margins, label sizes, and placement of Postage Indicia, and the size, placement, and other characteristics of POSTNET and PLANET™ bar codes, and any facing identification mark (FIM) on mail pieces are described in the Domestic Mail Manual (DMM) and Title 39, Code of Federal Register (CFR), Part 111, the contents of which are incorporated by reference in full herein for all purposes.

There are various laser and ink jet printers available for use, such as, for example, in conjunction with computers. Many home, office and small laser and ink jet printers are designed to accept sheets having a maximum width of 21.59 cm (8.5 inches), or in the case of wide format printers, about 27.94 cm (11 inches.) However, because many home and office printers are of the 21.59 cm (8.5 inches) variety, many self-adhesive label sheets have a width of 21.59 cm (8.5 inches) or less.

A label arrangement is needed for use with computer-based Postage systems and computer printer printable labels for use with computer-based Postage systems to facilitate Mail Piece Tracking. Further, a method is needed for printing a special purpose label arrangement that has a label portion adapted to be printed with postage indicia, a label portion adapted to be printed with a first one-dimensional barcode representing mailing identification information, in some embodiments, a second one-dimensional barcode representing delivery address information, and in some embodiments, a label portion adapted to be printed with a delivery address.

SUMMARY OF THE INVENTION

The present invention provides special purpose label arrangement sets for use with computer-based postage systems to facilitate mailing tracking, and sheets of such label arrangement sets, and methods for printing such label arrangement sets.

A first exemplary embodiment of the present invention provides a computer printer printable self-adhesive label set for use with a computer postage system, the label set comprising: a postage indicia label, wherein the postage indicia label is adapted to be printed with postage indicia; and an addressee label, wherein the addressee label is adapted to be printed with a delivery address, a first graphic symbology, such as a first barcode, representing mailing identification information, and a second graphic symbology, such as a second barcode, representing delivery address information.

One exemplary embodiment of the present invention provides a sheet of a plurality of computer printer printable self-adhesive label sets for use with a computer postage system, the sheet comprising: at least one self-adhesive label arrangement set, wherein each label arrangement set comprising: a postage indicia label, wherein the postage indicia label is adapted to be printed with postage indicia; and an addressee label, wherein the addressee label is adapted to be printed with a delivery address, a first graphic symbology, such as a first barcode, representing mailing identification information, and a second graphic symbology, such as a second barcode, representing delivery address information.

A second exemplary embodiment of the present invention provides a computer printer printable self-adhesive label set for use with a computer postage system, the label set comprising: a postage indicia label, wherein the postage indicia label is adapted to be printed with postage indicia; a first barcode label, wherein the first barcode label is adapted to be printed with a first graphic symbology, such as a first barcode, representing either mailing identification information or delivery address information. In the second exemplary embodiment, a second barcode label is provided wherein the second barcode label is adapted to be printed with a second graphic symbology, such as a second barcode, representing the other of either mailing identification information or delivery address information.

One exemplary embodiment of the present invention provides a sheet of a plurality of computer printer printable self-adhesive label sets for use with a computer postage system, the sheet comprising: at least one self-adhesive label arrangement set, wherein each label arrangement set comprising: a postage indicia label, wherein the postage indicia label is adapted to be printed with postage indicia; and a first barcode label, wherein the first barcode label is adapted to be printed with a first graphic symbology, such as a first barcode, representing mailing identification information.

One exemplary embodiment of the present invention provides a method for printing postage indicia and mail piece tracking information onto a single sheet of self-adhesive labels containing at least one self-adhesive label arrangement set, the method comprising: directing a computer postage system to print postage indicia on a postage indicia label of one of the self-adhesive label arrangement sets; and directing the computer postage system to print a first graphic symbology, such as a first barcode, representing mail piece tracking information on a first barcode label of the self-adhesive label arrangement set.

Another exemplary embodiment of the present invention provides a method for printing postage indicia and mailing tracking information onto a label arrangement set on a single sheet of self-adhesive labels, the method comprising: directing a computer postage system to print postage indicia on a first label of the label arrangement set wherein the first label of the label arrangement set is adapted to be printed with postage indicia; and directing the computer postage system to print a first graphic symbology on a second label of the label arrangement set, wherein the first graphic symbology represents mailing tracking information and wherein the second label of the label arrangement set is adapted to be printed with at least one graphic symbology representing mailing tracking information.

BRIEF DESCRIPTION OF THE DRAWINGS

These and other features, aspects, and advantages of the present invention will become better understood with regard to the following description, appended claims, and accompanying drawings in which:

FIG. 4 is a plan view of a further alternative configuration of first exemplary computer printer printable self-adhesive label arrangement sets for use with a computer postage system in an exemplary embodiment of the present invention;

FIG. 5 is a plan view of another alternative configuration of first exemplary computer printer printable self-adhesive label arrangement sets for use with a computer postage system in an exemplary embodiment of the present invention;

DETAILED DESCRIPTION OF THE INVENTION

Figure 1:
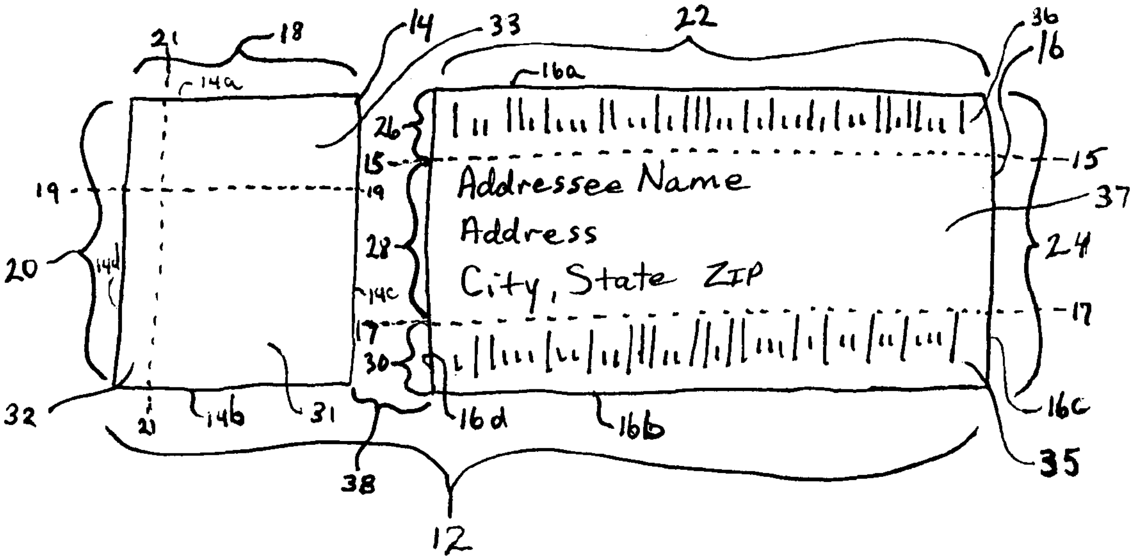
FIG. 1 is a plan view of a first exemplary computer printer printable self-adhesive label arrangement set for use with a computer postage system in an exemplary embodiment of the present invention.

FIG. 1 is a plan view of a first exemplary computer printer printable self-adhesive label arrangement set 12 for use with a computer postage system in an exemplary embodiment of the present invention. As depicted in FIG. 1, each first exemplary label arrangement set 12 includes a first label 14 and a second label 16.

Figure 2:
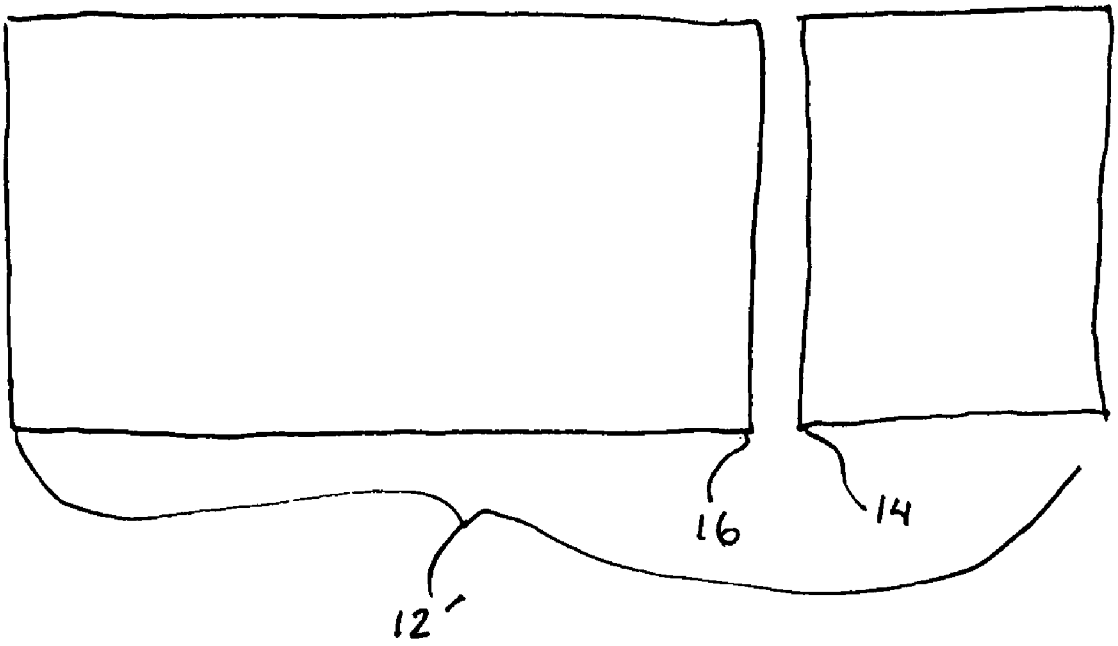
FIG. 2 is a plan view of a first alternative configuration of the first exemplary computer printer printable self-adhesive label arrangement set for use with a computer postage system in an exemplary embodiment of the present invention.

As depicted in FIG. 1, first label 14 of the first exemplary computer printer printable self-adhesive label arrangement set 12 is to the left of second label 16. It will be understood by someone with ordinary skill in the art that in an alternative embodiment, the order of first label 14 and second label 16 could be reversed, such as is depicted in FIG. 2, so that first label 14 of label arrangement set 12' is to the right of second label 16.

In the first exemplary computer printer printable self-adhesive label arrangement set 12 as depicted in FIG. 1, the first label 14 is a postage indicia label. Postage indicia label 14 has a top edge **14*a*, a bottom edge 14*b*, a right edge 14*c*, and a left edge 14*d*. Postage indicia label 14 has a width 18 and a height 20. In the first exemplary embodiment, width 18 measures approximately 1.25 inches; height 20 measures approximately 1.75 inches. Postage indicia label 14 is adapted to be printed with postage indicia. Postage indicia label 14 provides three sections 31, 32, and 33**.

It will be understood by someone with ordinary skill in the art that the measurements given herein of exemplary labels are themselves illustrative and non-limiting; other dimensions could be used without departing from the spirit of the invention.

When the first exemplary computer printer printable self-adhesive label arrangement set 12 depicted in FIG. 1 is used for printing postage indicia on secured labels wherein each postage indicia label has a pre-assigned serial number, a serial number may be printed on the label stock at the time the postage indicia is printed; the at-print-time serial number would be printed as a record of the printing.

Depending on the configuration of a plurality of label arrangement set 12, the serial number would typically be printed on the label stock that is not part of the postage indicia label or other label in the label arrangement set 12, either above, below or to the side of the postage indicia label 14. In some cases, depending on the configuration of the plurality of label arrangement set 12, the serial number may be printed according to an orientation that differs from the orientation of the postage indicia label 14. For example, in FIG. 3A, spaces 113-1, 113-2 and 113-3 would be adapted for printing a serial number record in landscape orientation as compared to the postage indicia labels 14-1, 14-2 and 14-3 which would be adapted for printing postage indicia in a portrait orientation.

It will be understood by someone with ordinary skill in the art that placement of space reservation for serial number record printing can be varied without departing from the spirit of the invention.

Returning with reference to FIG. 1, postage indicia label section 31 (below line 19-19 and to the right of line 21-21) is adapted to be printed with a two-dimensional postage indicia barcode. In an exemplary postage indicia label embodiment, an exemplary two-dimensional postage indicia barcode comprises information about the mail piece such as, for example, the destination ZIP code, the amount of postage applied, the date and time the postage was applied, and a digital signature so that the USPS can validate the authenticity of the postage.

It will be understood by someone with ordinary skill in the art that the description herein of embodiments of the invention regarding one-dimensional and two-dimensional barcodes is non-limiting and illustrative; one-dimensional and two-dimensional barcodes are exemplary graphic symbologies; graphic symbologies other than those described herein could be used with the invention. As a further non-limiting example, embodiments herein describing a one-dimensional barcode representing mailing identification information could use instead a two-dimensional graphic symbology to represent mailing information without departing form the spirit of the invention. It will be understood by someone with ordinary skill in the art that the terms “barcode” and “bar code” are sometimes used, as those terms are used herein, in a general sense as referring to graphic symbologies in bar, matrix, or various other forms. The terms barcode, bar code and graphic symbology (in the singular or plural) are used interchangeably herein.

Postage indicia label section 32 (to the left of line 21-21) is adapted to be printed with a serial number. In an exemplary postage indicia label embodiment, an exemplary serial number is printable in a landscape orientation.

Postage indicia label section 33 (above line 19-19 and to the right of line 21-21) is adapted to be printed with a human-readable portion. In an exemplary postage indicia label embodiment, an exemplary human-readable portion comprises a human-readable postage value, a human-readable mail class, a human-readable date, and optionally a visual logo.

The second label 16 is an addressee label. Addressee label 16 has a top edge **16*a*, a bottom edge 16*b*, a right edge 16*c* and a left edge 16*d*. In an exemplary addressee label embodiment, the left edge 16*d* of addressee label 16 is separated from the right edge 14*c* of postage indicia label 14 by a width 38 measuring approximately ⅛ inch. It will be understood by someone with ordinary skill in the art that, in alternative embodiments, the two labels 14 and 16 could abut each other; a single micro-perforated line separating the two labels 14 and 16** from each other.

The addressee label 16 is adapted to be printed with a human-readable delivery address, a first one-dimensional barcode representing mailing identification information, and a second one-dimensional barcode representing delivery address information. Addressee label 16 has a width 22 and a height 24. In the first exemplary embodiment, width 22 measures approximately 4 inches; height 24 measures approximately 1.75 inches. The addressee label 16 provides three sections 35, 36, and 37.

The first addressee label section 35, which is below line 17-17, is adapted for printing a one-dimensional barcode comprising one of a one-dimensional barcode representing mailing identification information, such as a one-dimensional barcode representation of a PLANET™ code, or a one-dimensional barcode representing delivery address information, such as a one-dimensional barcode representation of a POSTNET code. First addressee label section 35 has a height 30. In the first exemplary computer printer printable self-adhesive label arrangement set 12, height 30 measures approximately 0.3 inch.

The second addressee label section 36, which is above line 15-15, is adapted for printing a one-dimensional barcode comprising the other of a one-dimensional barcode representation of a PLANET™ code or a one-dimensional barcode representation of a POSTNET code. Second addressee label section 36 has a height 26. In the first exemplary computer printer printable self-adhesive label arrangement set 12, height 26 measures approximately 0.3 inch.

The third addressee label section 37, which is above line 17-17, and below line 15-15, is adapted for printing a human-readable delivery address. Third addressee label section 37 has a height 28. In the first exemplary computer printer printable self-adhesive label arrangement set 12, height 28 measures approximately 1.15 inches.

As will be understood by someone with ordinary skill in the art, dashed lines such as 15-15, 17-17, 19-19, and 21-21 are depicted in the drawings here but are not evident on the actual labels.

In an alternative embodiment, no postage indicia label is provided, only a delivery address label 16 would be provided, and would be adapted to be printed with a human-readable delivery address, a first one-dimensional barcode representing mailing identification information, and a second one-dimensional barcode representing delivery address information as described above.

Figure 3A:
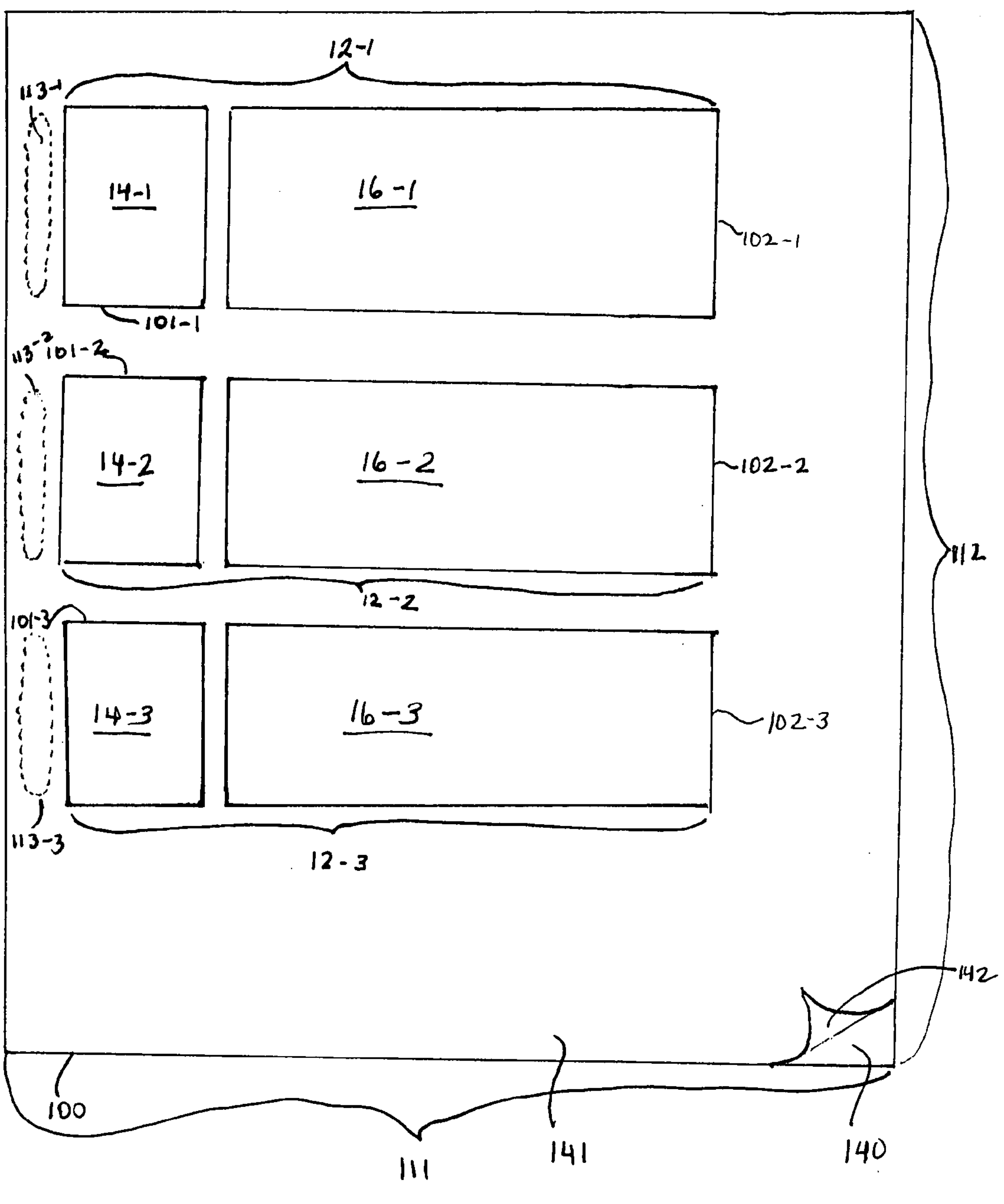
FIG. 3A is a plan view of an exemplary sheet of a plurality of first exemplary computer printer printable self-adhesive label arrangement sets for use with a computer postage system in an exemplary embodiment of the present invention.
Figure 3B:
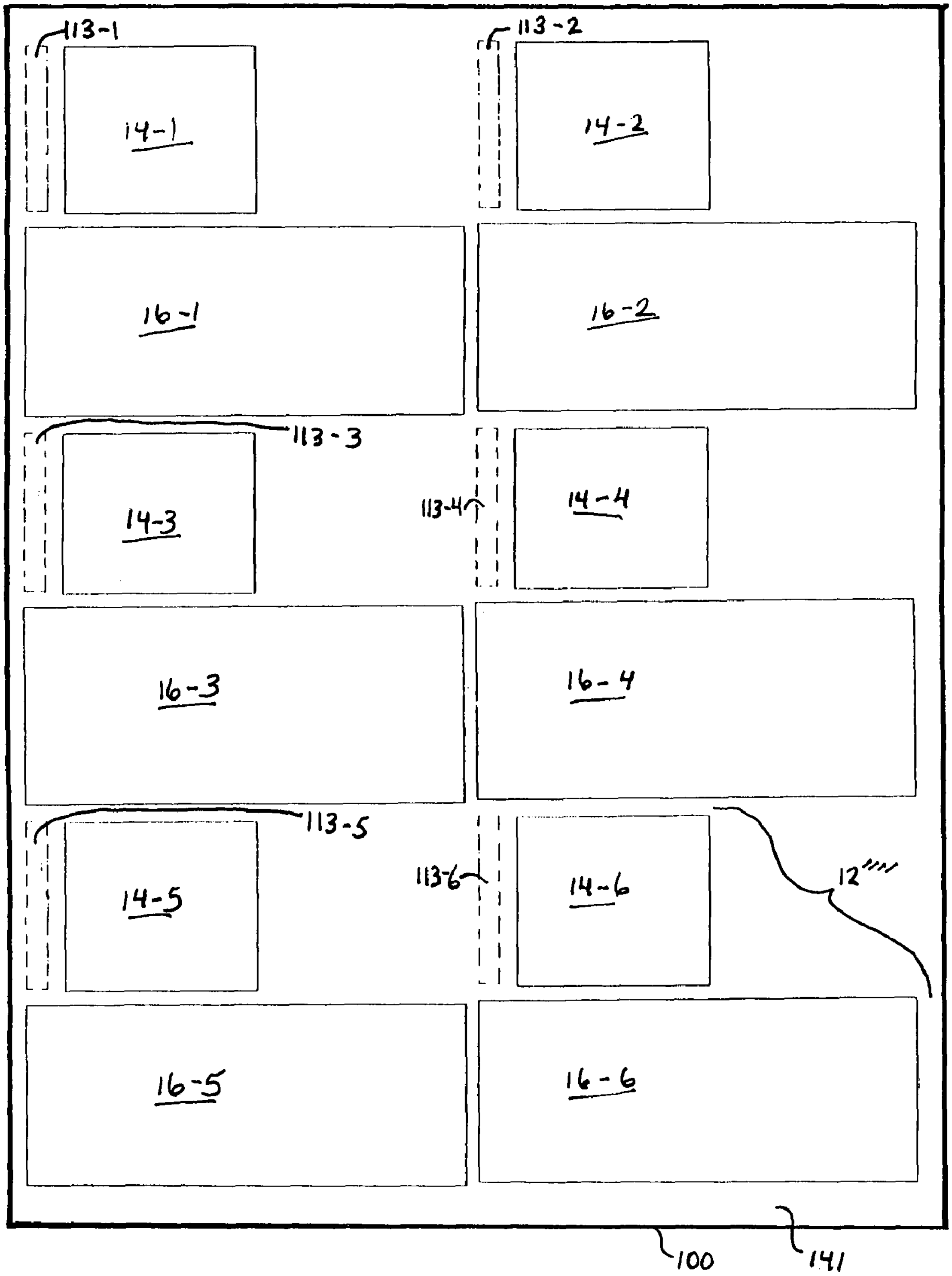
FIG. 3B is a plan view of a sheet on which is disposed a plurality of an alternative configuration of first exemplary computer printer printable self-adhesive label arrangement sets for use with a computer postage system in an exemplary embodiment of the present invention.
Figure 3C:
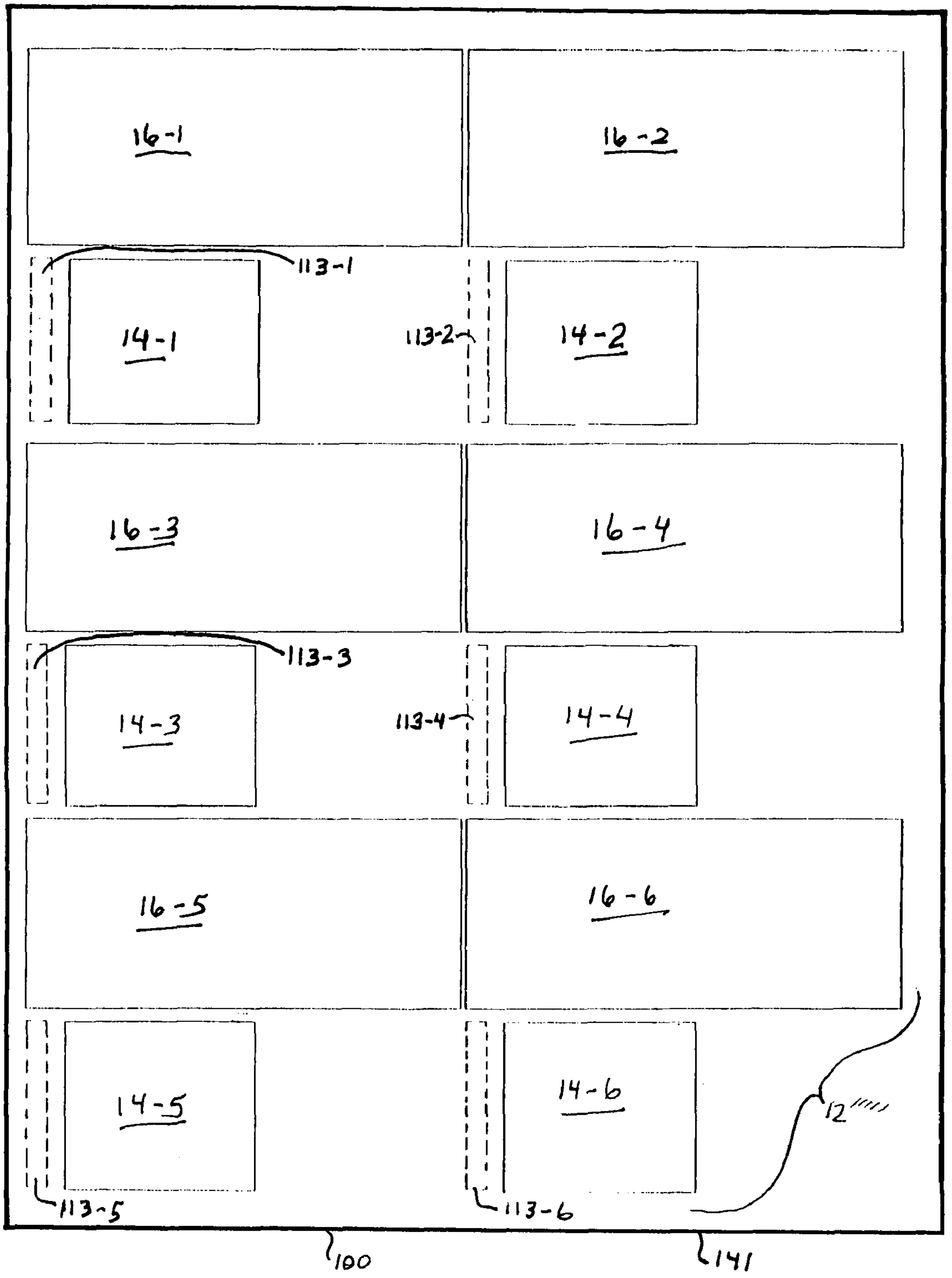
FIG. 3C is a plan view of a sheet on which is disposed a plurality of further alternative configuration of first exemplary computer printer printable self-adhesive label arrangement sets for use with a computer postage system in an exemplary embodiment of the present invention.

As will be understood by someone with ordinary skill in the art, a plurality of the first exemplary computer printer printable self-adhesive label arrangement set 12 depicted in FIG. 1 may be arranged in various possible ways on a sheet of arrangement sets. An exemplary sheet 100 comprising a plurality of first exemplary computer printer printable self-adhesive label arrangement sets 12-1 through 12-3 is depicted in FIG. 3A. Exemplary sheet 100 has a width 111 that measures 8.5 inches and a height 112 that measures 11 inches.

The construction of a sheet 100 of self-adhesive labels is conventional in that sheet 100 provides a top printable layer 141. On the back 142 of the top printable layer 141, adhesive material is provided covering the entire back 142. Exemplary sheet 100 further provides a backing sheet 140 with low adhesion. The low adhesion of backing sheet 140 facilitates removal of a set, e.g., set 12-1 of labels 14-1 and 16-1 from sheet 100 so that the labels 14-1 and 16-1 can then be permanently attached to a mailing piece (not shown).

Each label, e.g., 14-1 and 16-1, provide a corresponding perimeter, 101-1 and 102-1, respectively. As will be understood by someone with ordinary skill in the art, the perimeter, e.g., 101-1 and 102-1, of each label, 14-1 and 16-1, respectively, is formed, such as by, e.g., micro-perforations, that pierce the top printable layer 141, but not the backing sheet 140.

Figure 6:
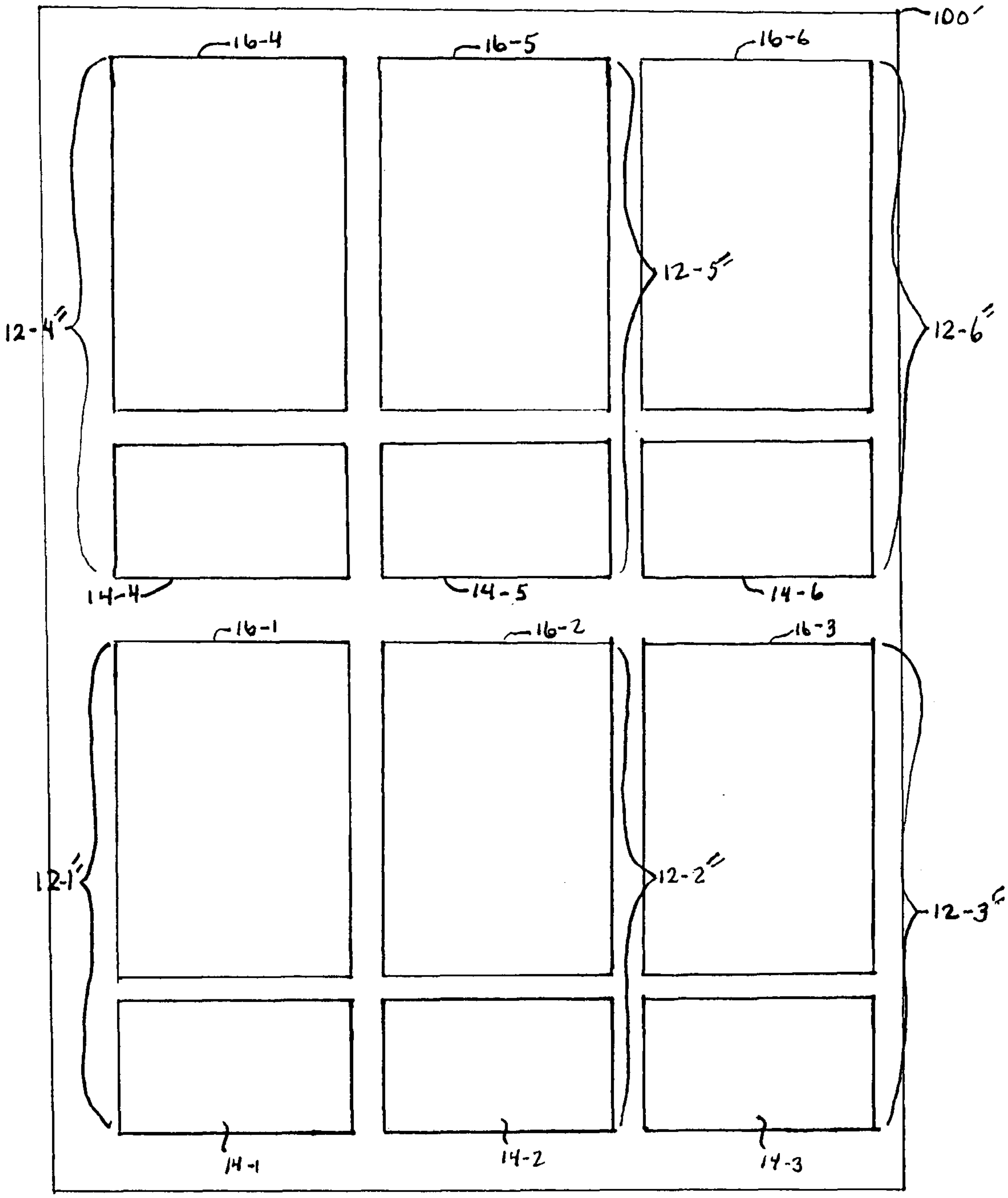
FIG. 6 is a plan view of a sheet on which is disposed a plurality of another alternative configuration of first exemplary computer printer printable self-adhesive label arrangement sets for use with a computer postage system in an exemplary embodiment of the present invention.

Label sets 12, and 12-1 through 12-3, depicted in FIGS. 1 through 3A are depicted in portrait orientation respective to the sections adapted to be printed with human readable text, such as postage indicia label section 33 and delivery address label section 37. It will be understood by someone with ordinary skill in the art that landscape orientation of the label sets 12" and 12'", such as depicted in FIGS. 4 and 5, respectively, are also possible. FIG. 6 depicts an exemplary alternative arrangement of label sets 12-1" through 12-6" in which each label set 12-1" through 12-6" is provided in landscape orientation respective to the sections adapted to be printed with human readable text, such as postage indicia label section 33 and delivery address label section 37. FIGS. 3B and 3C depict plan views of further alternative arrangement label sets 12"" and 12'"", respectively. In alternative arrangement label sets 12"" and 12'"", postage indicia labels, e.g., 14-1, are adapted to be printed in landscape orientation relative to portrait orientation of delivery address labels, e.g., 16-1. In alternative arrangement label set 12"" depicted in FIG. 3B, postage indicia label, e.g., 14-6, with reference to portrait orientation of sheet 100, is provided above delivery address label, e.g., 16-6, of the set. In alternative arrangement label set 12'"" depicted in FIG. 3C, postage indicia label, e.g., 14-6, with reference to portrait orientation of sheet 100, is provided below delivery address label, e.g., 16-6, of the set.

In one exemplary embodiment of the present invention, a method for printing postage indicia and mail piece tracking information onto a single sheet of self-adhesive labels containing at least one self-adhesive label arrangement set is provided. In the exemplary method, a computer postage system is directed to print postage indicia on a postage indicia label of one of the self-adhesive label arrangement sets. The computer postage system is further directed to print a first one-dimensional barcode representing mail piece tracking information on a first one-dimensional barcode label of the self-adhesive label arrangement set.

In another exemplary embodiment of the present invention, a method is provided for printing postage indicia and mailing tracking information onto a label arrangement set on a single sheet of self-adhesive labels. In this method, a computer postage system is directed to print postage indicia on a first label of the label arrangement set wherein the first label of the label arrangement set is adapted to be printed with postage indicia. The computer postage system is further directed to print a first graphic symbology on a second label of the label arrangement set, wherein the first graphic symbology represents mailing tracking information and wherein the second label of the label arrangement set is adapted to be printed with at least one graphic symbology representing mailing tracking information.

Figure 7A:
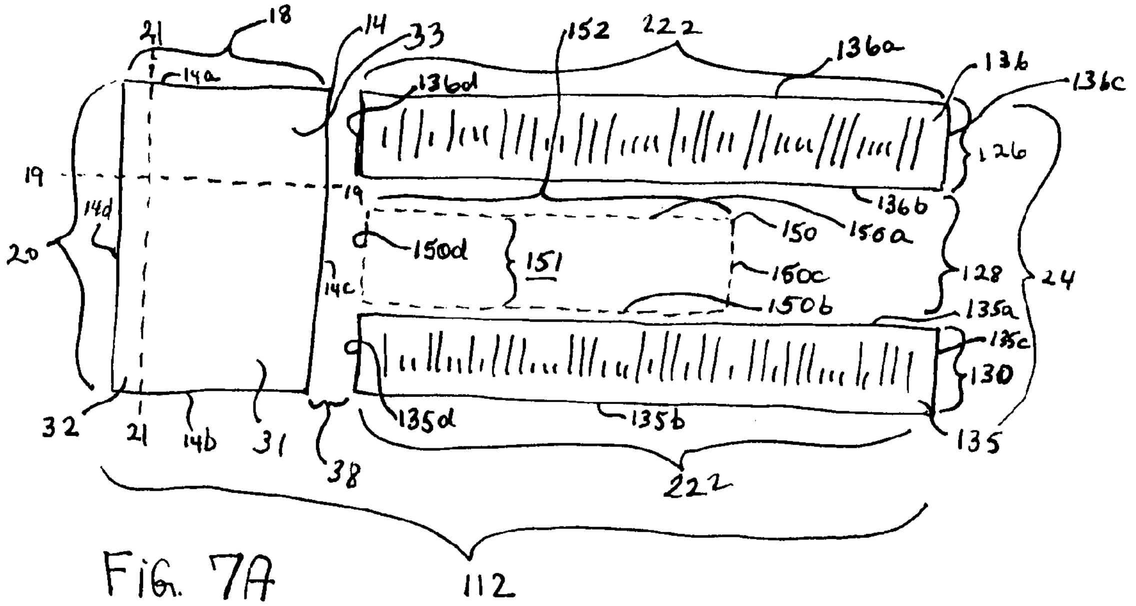
FIG. 7A is a plan view of a second exemplary computer printer printable self-adhesive label arrangement set for use with a computer postage system in an exemplary embodiment of the present invention.

FIG. 7A is a plan view of a second exemplary computer printer printable self-adhesive label arrangement set 112 for use with a computer postage system in an exemplary embodiment of the present invention. As depicted in FIG. 7A, each second exemplary label arrangement set 112 includes a first label 14, a second label 135, and a third label 136. Optionally, label arrangement set 112 could include a fourth label 150.

Figure 8:
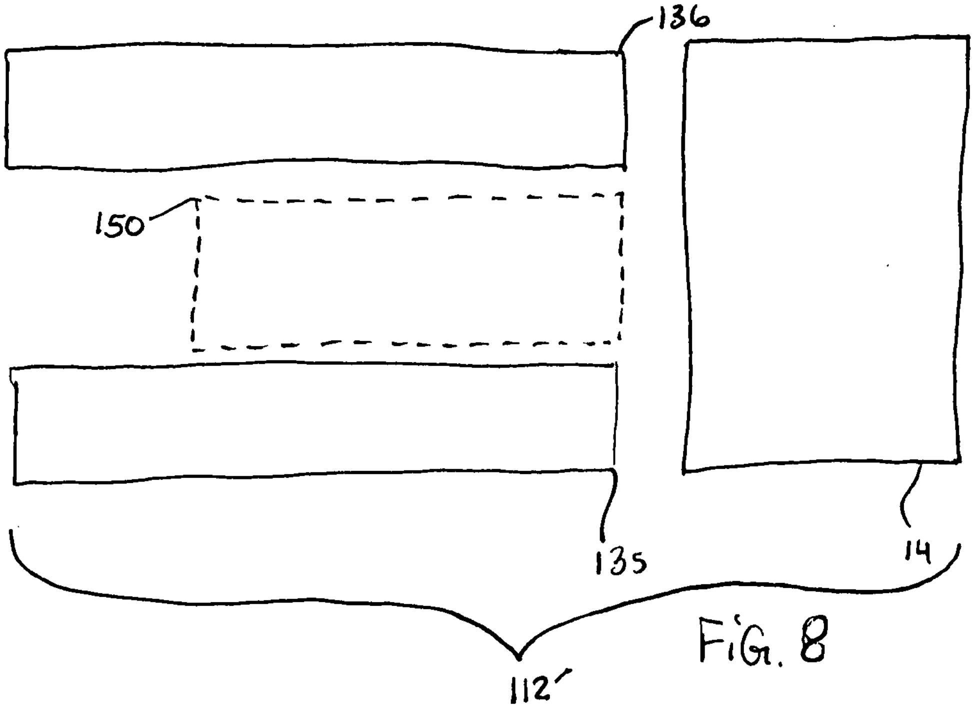
FIGS. 8 through 11 are plan views of various alternative configurations of a second exemplary computer printer printable self-adhesive label arrangement set for use with a computer postage system in an exemplary embodiment of the present invention.

As depicted in FIG. 7A, first label 14 of the second exemplary computer printer printable self-adhesive label arrangement set 112 is to the left of second and third labels 135 and 136, respectively. It will be understood by someone with ordinary skill in the art that in an alternative embodiment, the order of first label 14 on the one hand, and second and third labels 135 and 136, respectively (and optionally, fourth label 150) on the other hand, could be reversed, such as is depicted in FIG. 8, so that first label 14 of label arrangement set 112' is to the right of second and third labels 135 and 136 respectively (and optionally, fourth label 150).

In the second exemplary computer printer printable self-adhesive label arrangement set 112 as depicted in FIG. 7A, first label 14 is a postage indicia label. Postage indicia label 14 has a top edge 14*a*, a bottom edge 14*b*, a right edge 14*c*, and a left edge 14*d*. Postage indicia label 14 depicted in FIG. 7A shares the same features as postage indicia label 14 described above with respect to the first exemplary embodiment and depicted in, e.g., FIG. 1. Accordingly, postage indicia label 14 is not further described with respect to the second exemplary embodiment.

In the second exemplary computer printer printable self-adhesive label arrangement set 112 as depicted in FIG. 7A, second label 135 is a one-dimensional barcode label. One-dimensional barcode label 135 is adapted to be printed with a first one-dimensional barcode representing either mailing identification information, such as a PLANET™ code, or delivery address information, such as a POSTNET code. One-dimensional barcode label 135 has a top edge 135*a*, a bottom edge 135*b*, a right edge 135*c*, and a left edge 135*d*. One-dimensional barcode label 135 has a width 222 and a height 130. In the second exemplary embodiment, the width 222 of one-dimensional barcode label 135 measures approximately 2.875 inches; height 130 measures approximately 0.3 inch.

In the second exemplary computer printer printable self-adhesive label arrangement set 112 as depicted in FIG. 7A, third label 136 is a one dimensional barcode label. One-dimensional barcode label 136 is adapted to be printed with a second one-dimensional barcode representing the other of either mailing identification information, such as a PLANET™ code, or delivery address information, such as a POSTNET code. One-dimensional barcode label 136 has a top edge 136*a*, a bottom edge 136*b*, a right edge 136*c*, and a left edge 136*d*. One-dimensional barcode label 136 has a width 222 and a height 126. In the second exemplary embodiment, the width 222 of one-dimensional barcode label 136 measures approximately 2.875 inches; height 126 measures approximately 0.3 inch.

In an exemplary embodiment that includes a return address label 150, optional fourth label 150 is a return address label. Optional return address label 150 is adapted to be printed with a return address representing the return address of the mailer. Optional return address label 150 has a top edge 150*a*, a bottom edge 150*b*, a right edge 150*c*, and a left edge 150*d*. Optional return address label has a width 152 and a height 151. In an exemplary embodiment that includes a return address label 150, the width 152 of optional return address label 150 measures approximately 2 inches; height 151 measures approximately 1.25 inches.

In the second exemplary computer printer printable self-adhesive label arrangement set 112 as depicted in FIG. 7A, top edge 135*a* of one-dimensional barcode label 135 is separated from bottom edge 136*b* of one-dimensional barcode label 136 by an expanse 128 of top printable layer (see element 141 in FIG. 3A); the exemplary expanse 128 depicted in FIG. 7A measures approximately ⅞ inch. In the second exemplary computer printer printable self-adhesive label arrangement set 112 as depicted in FIG. 7A, if optional return address label 150 is provided, it would be provided between one-dimensional barcode label 135 and one-dimensional barcode label 136.

Figure 7B:
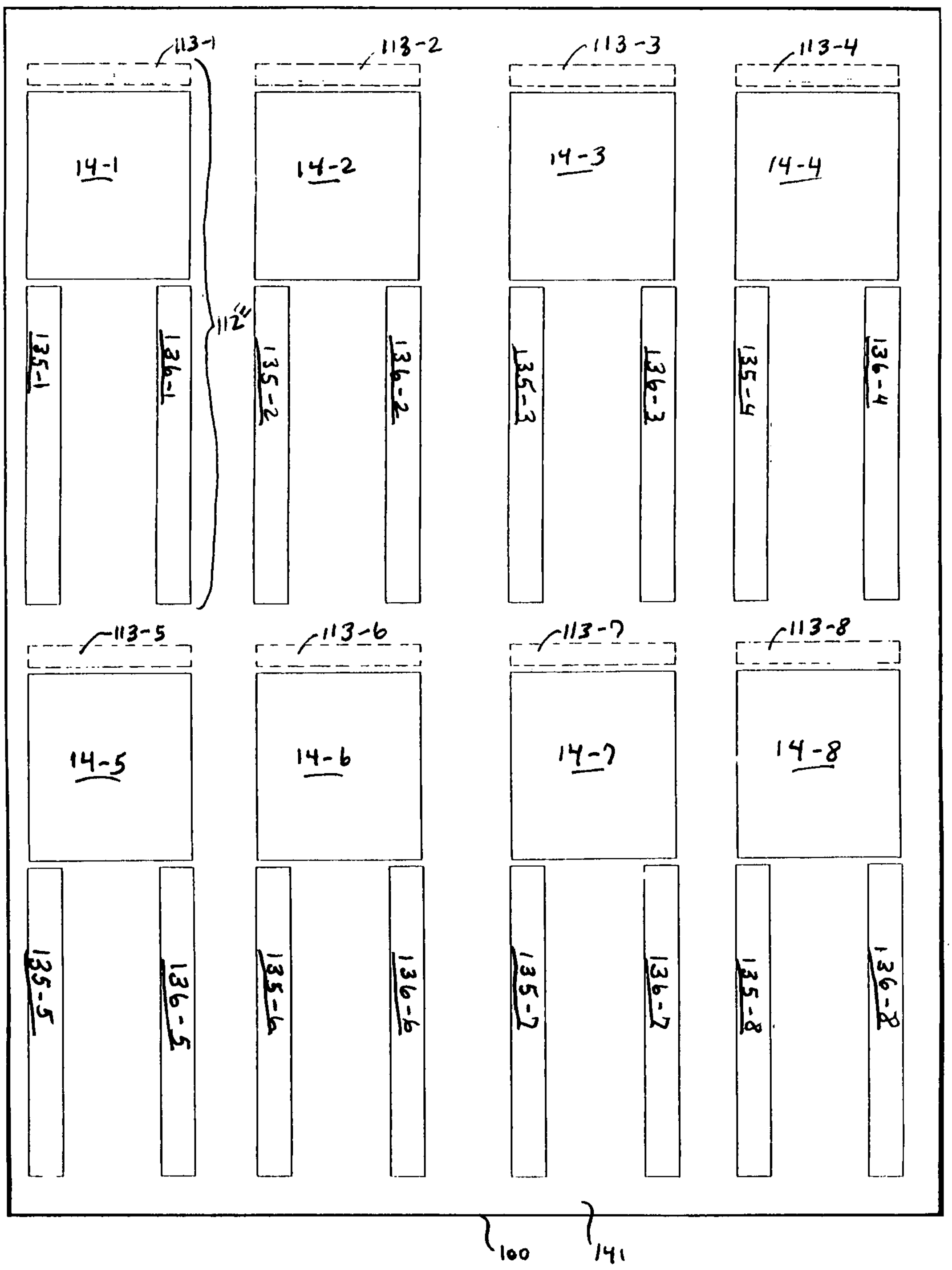
FIG. 7B is a plan view of an exemplary sheet of a plurality of an alternative configuration of second exemplary computer printer printable self-adhesive label arrangement sets for use with a computer postage system in an exemplary embodiment of the present invention.

FIG. 7B is a plan view of a sheet 100 of a plurality of exemplary label arrangement sets 112'''. Each exemplary label arrangement set 112''' comprises: a postage indicia label, e.g., 14-1, that is adapted to be printed with postage indicia in portrait orientation; a first one-dimensional barcode label, e.g., 135-1, that is adapted to be printed with a first one-dimensional barcode representing either mailing identification information, such as a PLANET™ code, or delivery address information, such as a POSTNET code in landscape orientation; and a second one-dimensional barcode label, e.g., 136-1, that is adapted to be printed with a second one-dimensional barcode representing the other of either mailing identification information, such as a PLANET™ code, or delivery address information, such as a POSTNET code, in landscape orientation; both barcode labels, e.g., 135-1 and 136-1 are provided below the corresponding postage indicia label, e.g., 14-1.

Figure 7C:
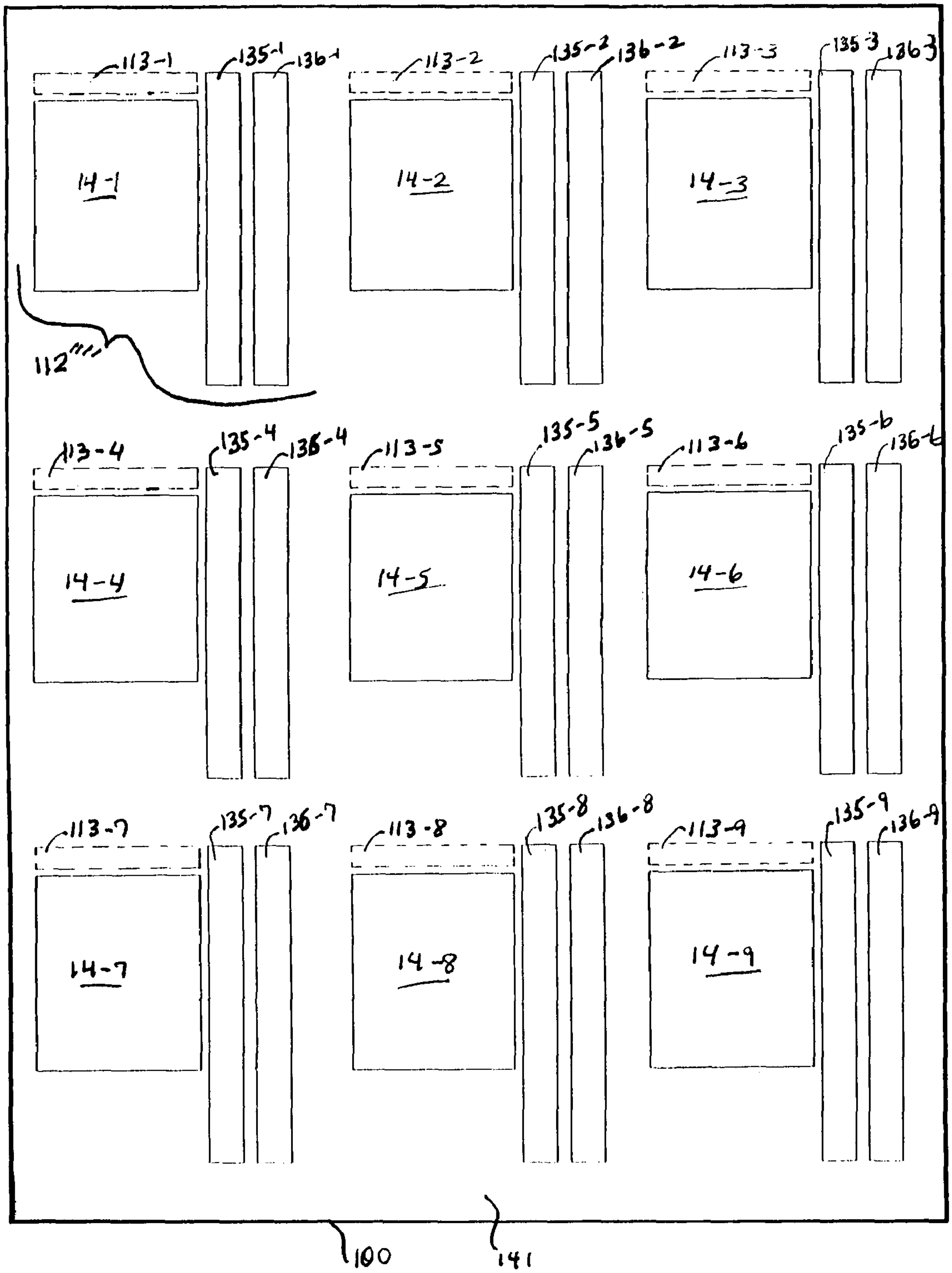
FIG. 7C is a plan view of a sheet of a plurality of a further alternative configuration of second exemplary computer printer printable self-adhesive label arrangement sets for use with a computer postage system in an exemplary embodiment of the present invention.

FIG. 7C is a plan view of a sheet 100 of a plurality of exemplary label arrangement sets 112''''. Each exemplary label arrangement set 112'''' comprises: a postage indicia label, e.g., 14-1, that is adapted to be printed with postage indicia in portrait orientation; a first one-dimensional barcode label, e.g., 135-1, that is adapted to be printed with a first one-dimensional barcode representing either mailing identification information, such as a PLANET™ code, or delivery address information, such as a POSTNET code, in landscape orientation; and a second one-dimensional barcode label, e.g., 136-1, that is adapted to be printed with a second one-dimensional barcode representing the other of either mailing identification information, such as a PLANET™ code, or delivery address information, such as a POSTNET code, in landscape orientation; both barcode labels, e.g., 135-1 and 136-1 are provided to the right of the corresponding postage indicia label, e.g., 14-1.

Figure 9:
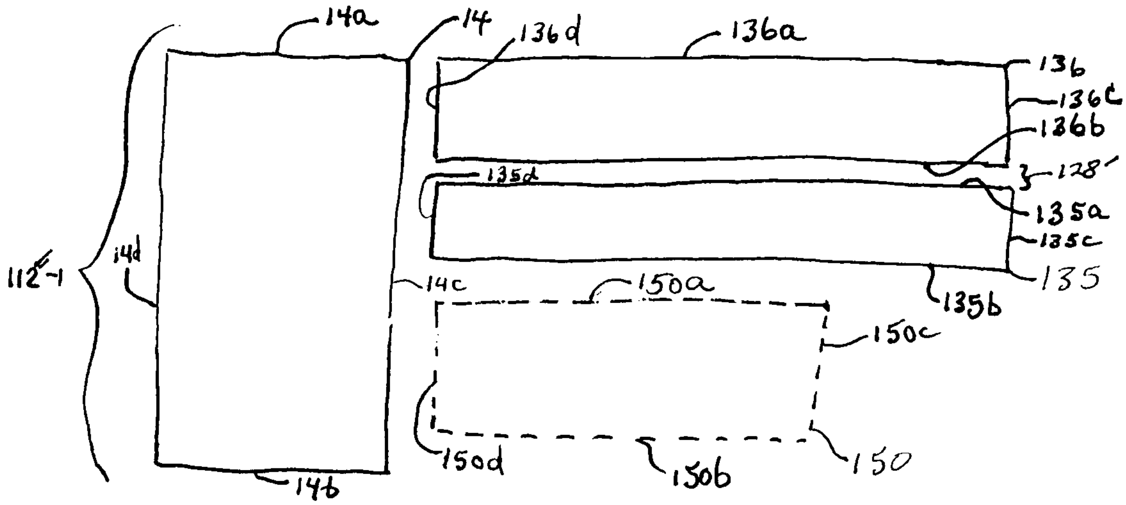
Figure 10:
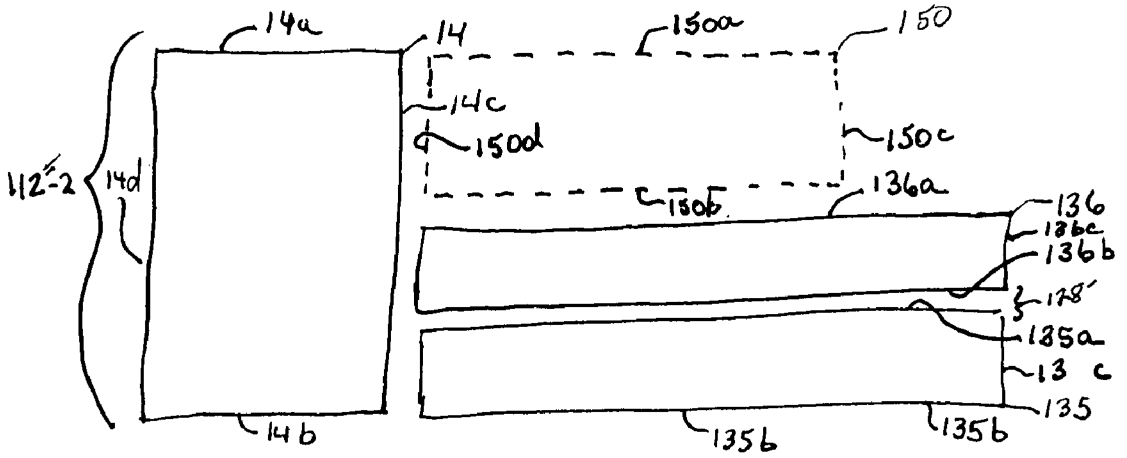
Figure 11:
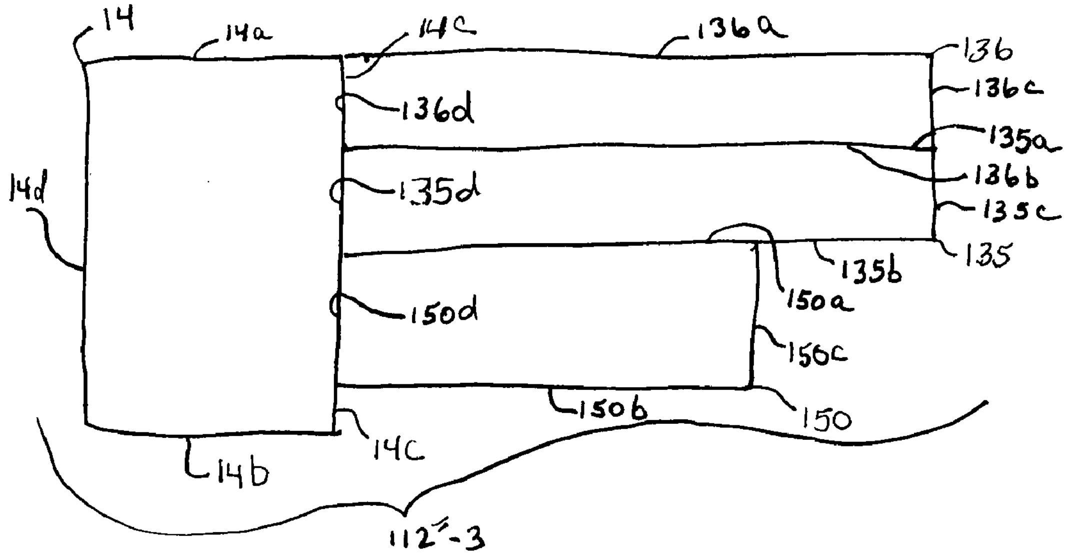
Figure 12:
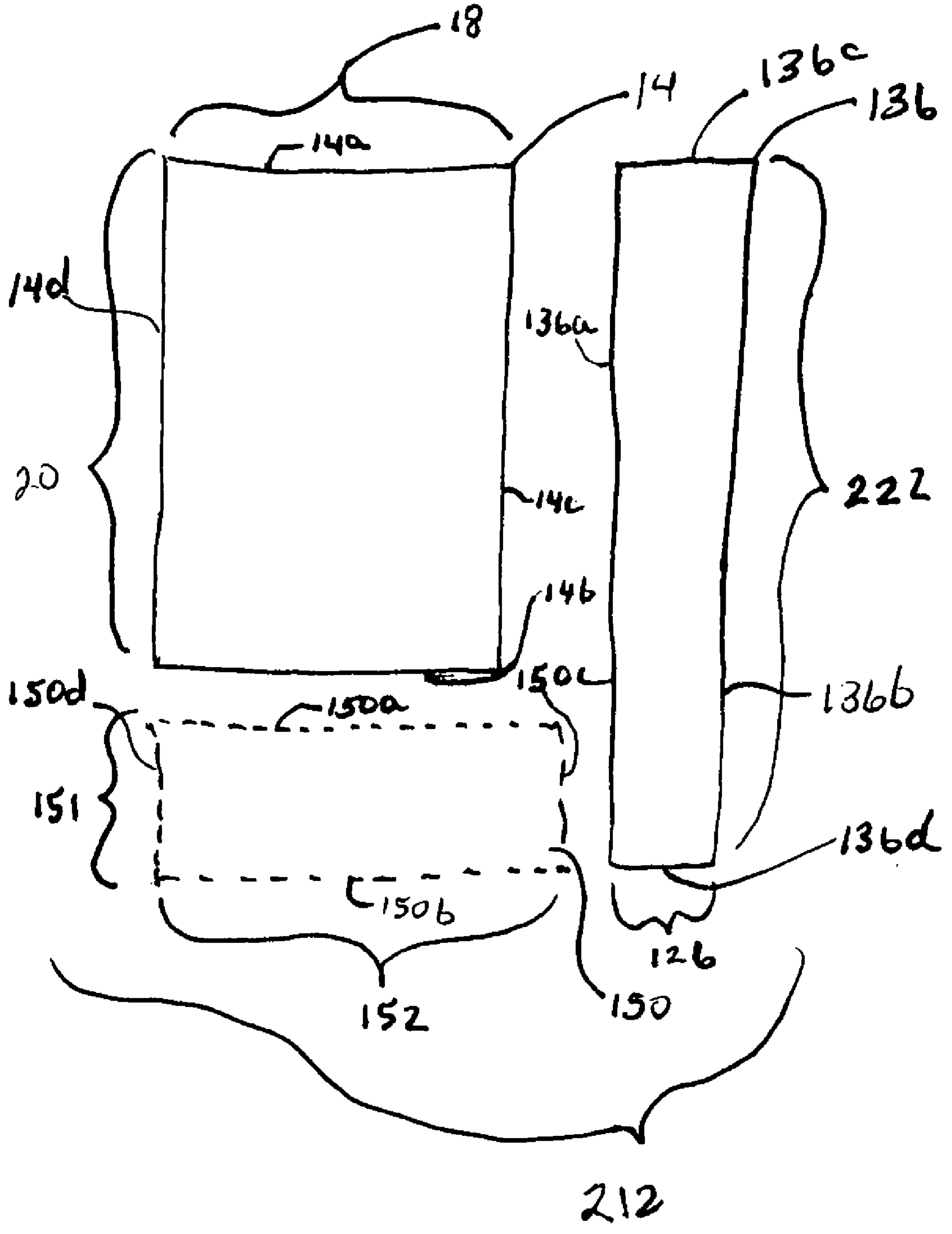
FIGS. 12 through 16 are plan views of various alternative configurations of a third exemplary computer printer printable self-adhesive label arrangement set for use with a computer postage system in an exemplary embodiment of the present invention.
Figure 13:
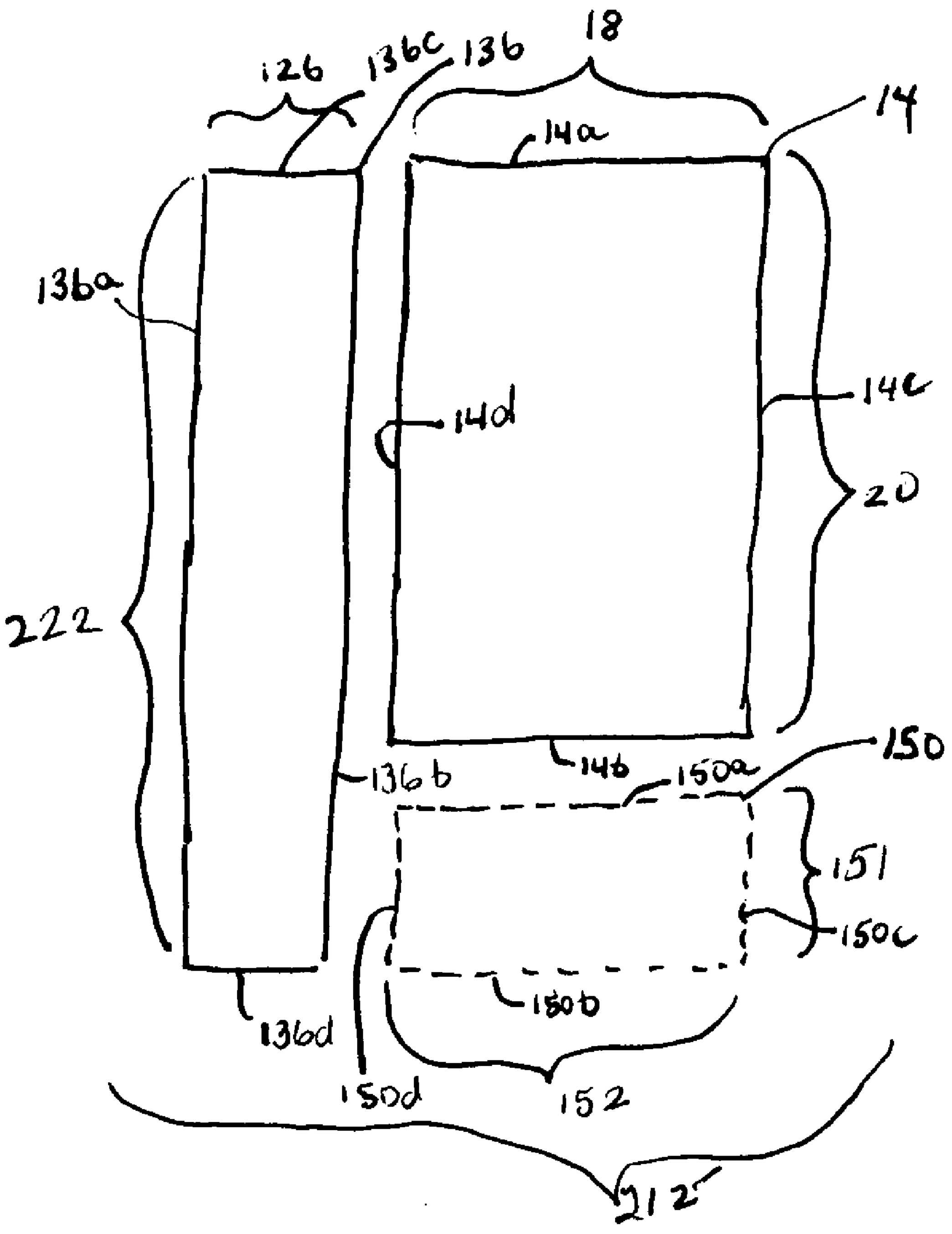
Figure 14:
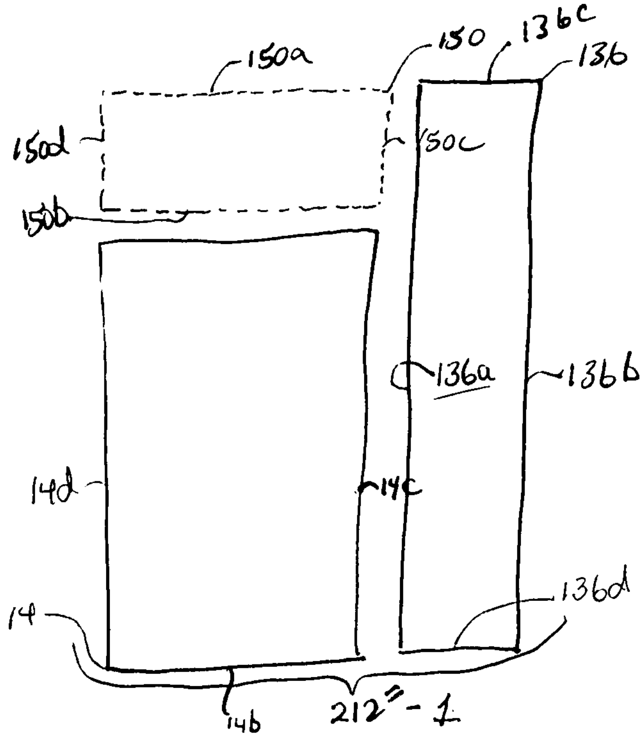
Figure 15:
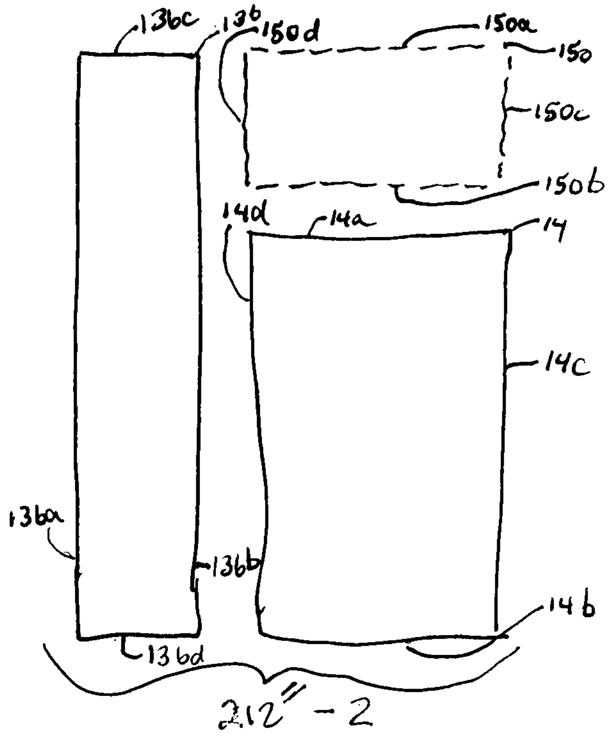

It will be understood by someone with ordinary skill in the art that alternative arrangements of one-dimensional barcode label 135, and one-dimensional barcode label 136, such as, but not limited to, those alternative label arrangement sets 112"-1, 112"-2 and 112"-3 depicted in FIGS. 9, 10 and 11, respectively.

In the label arrangement set 112"-1 depicted in FIG. 9, one-dimensional barcode label 135 is separated by an expanse 128' from one-dimensional barcode label 136, where expanse 128' measures only approximately ⅛ inch; top edge 150*a* of optional return address label 150, if present, would be below bottom edge 135*b* of one-dimensional barcode label 135.

In the label arrangement set 112"-2 depicted in FIG. 10, bottom edge 150*b* of optional return address label 150, if present, would be above top edge 136*a* of one-dimensional barcode label 136.

In the label arrangement set 112"-3 depicted in FIG. 11, top edge 150*a* of return address label 150 abuts bottom edge 135*b* of one-dimensional barcode label 135; top edge 135*a* of one-dimensional barcode label 135 abuts bottom edge 136*b* of one-dimensional barcode label 136; left edges 150*d*, 135*d*, and 136*d* of labels 150, 135 and 136, respectively, abut right edge 14*c* of postage indicia label 14.

FIGS. 12 through 16 are a plan views of a third exemplary computer printer printable self-adhesive label arrangement set 212, 212', 212"-1, 212"-2, and 212''', respectively for use with a computer postage system in an exemplary embodiment of the present invention. As depicted in FIGS. 12 through 16, each second exemplary label arrangement set 212 (and 212', 212"-1, 212"-2, and 212''') includes a first label 14, and a second label 136. Optionally, label arrangement set 212 (and 212', 212"-1, 212"-2, and 212''') could include a third label 150.

In the label arrangement sets 212, 212', 212"-1, 212"-2, and 212'" depicted in FIGS. 12 through 16, first label 14 is a postage indicia label. Postage indicia label 14 depicted in FIGS. 12 through 16 shares the same features as postage indicia label 14 described above with respect to the first exemplary embodiment and depicted in, e.g., FIG. 1. Accordingly, postage indicia label 14 is not further described with respect to the third exemplary embodiment.

In the label arrangement sets 212, 212', 212"-1, 212"-2, and 212'" depicted in FIGS. 12 through 16, second label 136 is a one-dimensional barcode label 136. One-dimensional barcode label 136 depicted in FIGS. 12 through 16 shares the same features as one-dimensional barcode label 136 described above with respect to the second exemplary embodiment and depicted in, e.g., FIG. 7A. Accordingly, one-dimensional barcode label 136 is not further described with respect to the third exemplary embodiment.

In the label arrangement sets 212, 212', 212"-1, 212"-2, and 212'" depicted in FIGS. 12 through 16, optional third label 150 is a return address label 150. Return address label 150 depicted in FIGS. 12 through 16 shares the same features as return address label 150 described above with respect to the second exemplary embodiment and depicted in, e.g., FIG. 7A. Accordingly, return address label 150 is not further described with respect to the third exemplary embodiment.

In the label arrangement sets 212, 212', 212"-1, 212"-2, and 212'" depicted in FIGS. 12 through 16, either the top edge 150*a* of optional return address label 150 faces the bottom edge 14*b* or bottom edge 150*b* faces the top edge 14*a* of postage indicia label 14, as the case may be.

Figure 16:
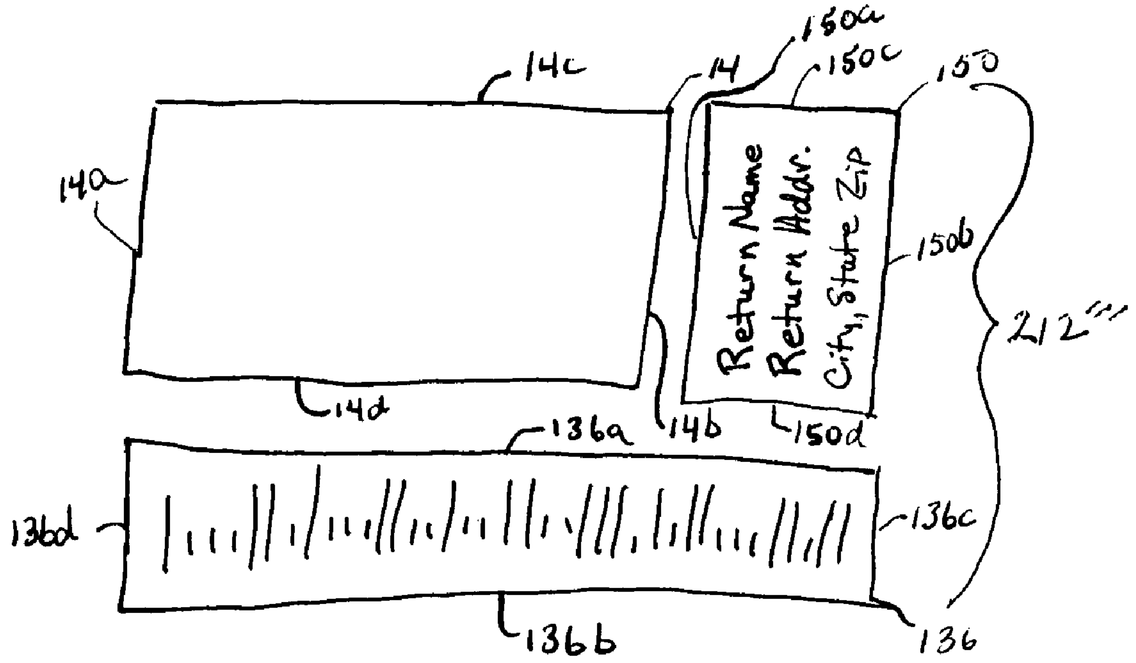

In the label arrangement sets 212, 212', 212"-1, 212"-2, and 212'" depicted in FIGS. 12 through 15, either the top edge 136*a* of one-dimensional barcode label 136 faces the right edges 14*c* and 150*c* of postage indicial label 14 and return address label 150, respectively, or the bottom edge 136*b* of one-dimensional barcode label 136 faces the left edges 14*d* and 150*d* of postage indicial label 14 and return address label 150, respectively, as the case may be. In FIG. 16, top edge 136*a* of one-dimensional barcode label 136 faces left edges 14*d* and 150*d* of postage indicial label 14 and return address label 150, respectively.

The labels provided in label arrangement sets 212, 212', 212"-1, 212"-2, and 212'" depicted in FIGS. 12 through 16, are adapted for printing only a single one-dimensional barcode representing either mailing identification information, such as a PLANET™ code, or delivery address information, such as a POSTNET code. The orientation of the one-dimensional barcode label 136 is reversed from that of the orientation of the postage indicia label 14 and the return address label 150. For example, in FIGS. 12 through 15, postage indicia label 14 and the return address label 150 are adapted for printing postage indicia and return address respectively in portrait orientation; one-dimensional barcode label 136 is adapted for printing in a landscape orientation, a one-dimensional barcode representing either mailing identification information, such as a PLANET™ code, or delivery address information, such as a POSTNET code. In FIG. 16, postage indicia label 14 and the return address label 150 are adapted for printing postage indicia and return address respectively in landscape orientation; one-dimensional barcode label 136 is adapted for printing in portrait orientation, a one-dimensional barcode representing either mailing identification information, such as a PLANET™ code, or delivery address information, such as a POSTNET code.

Figure 17:
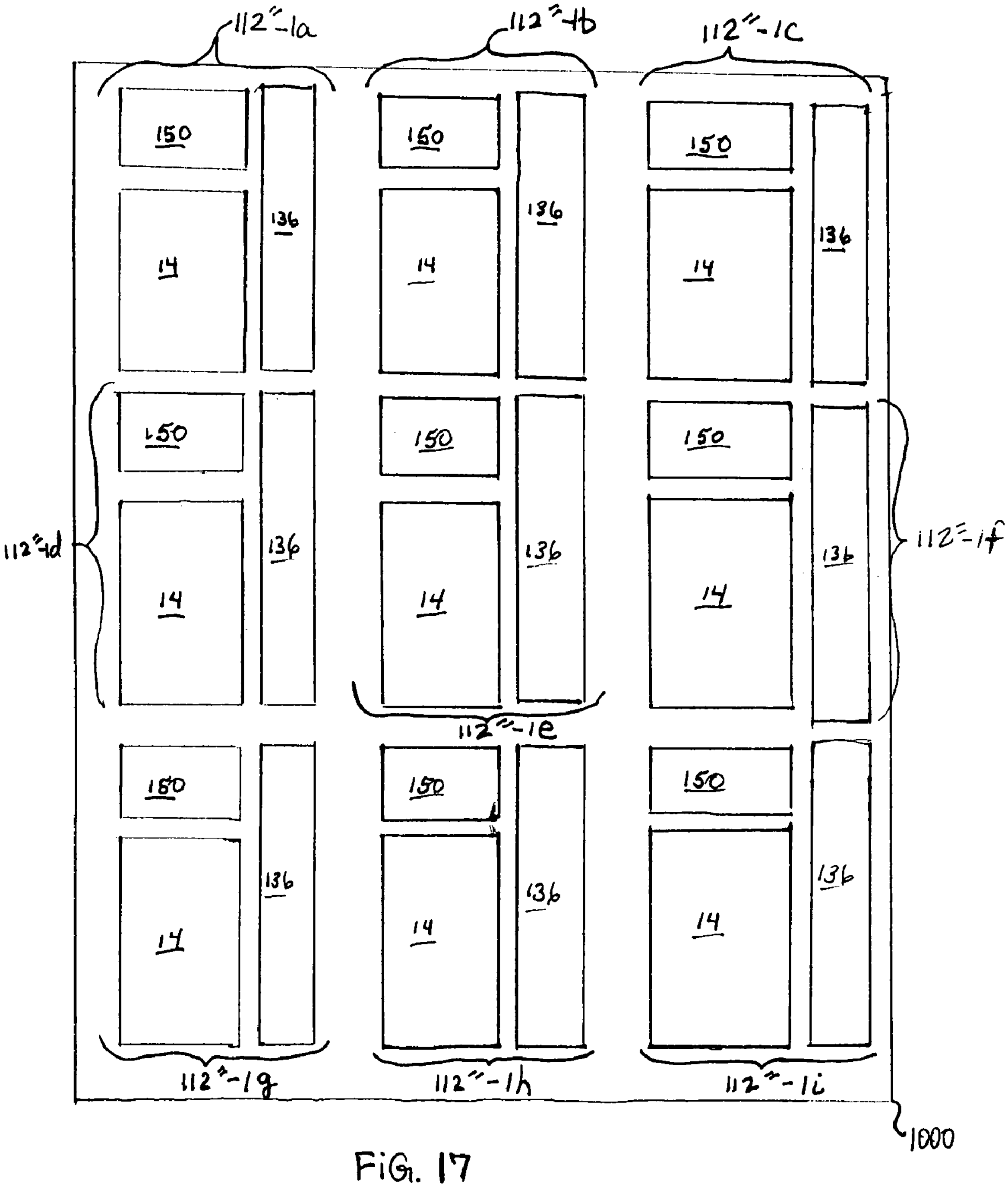
FIG. 17 is a plan view of a sheet of a plurality of an alternative configuration of third exemplary computer printer printable self-adhesive label arrangement sets for use with a computer postage system in an exemplary embodiment of the present invention.

As will be understood by someone with ordinary skill in the art, a plurality of label arrangement sets 112 and 212 (and 212', 212"-1, 212"-2, and 212'") can be arranged on sheets in various configurations. For example, FIG. 17 depicts a plan view of an exemplary configuration of a sheet 1000 of a plurality of label arrangement sets 112"-1 (112"-1*a* through 112"-1*i*).

Figure 18:
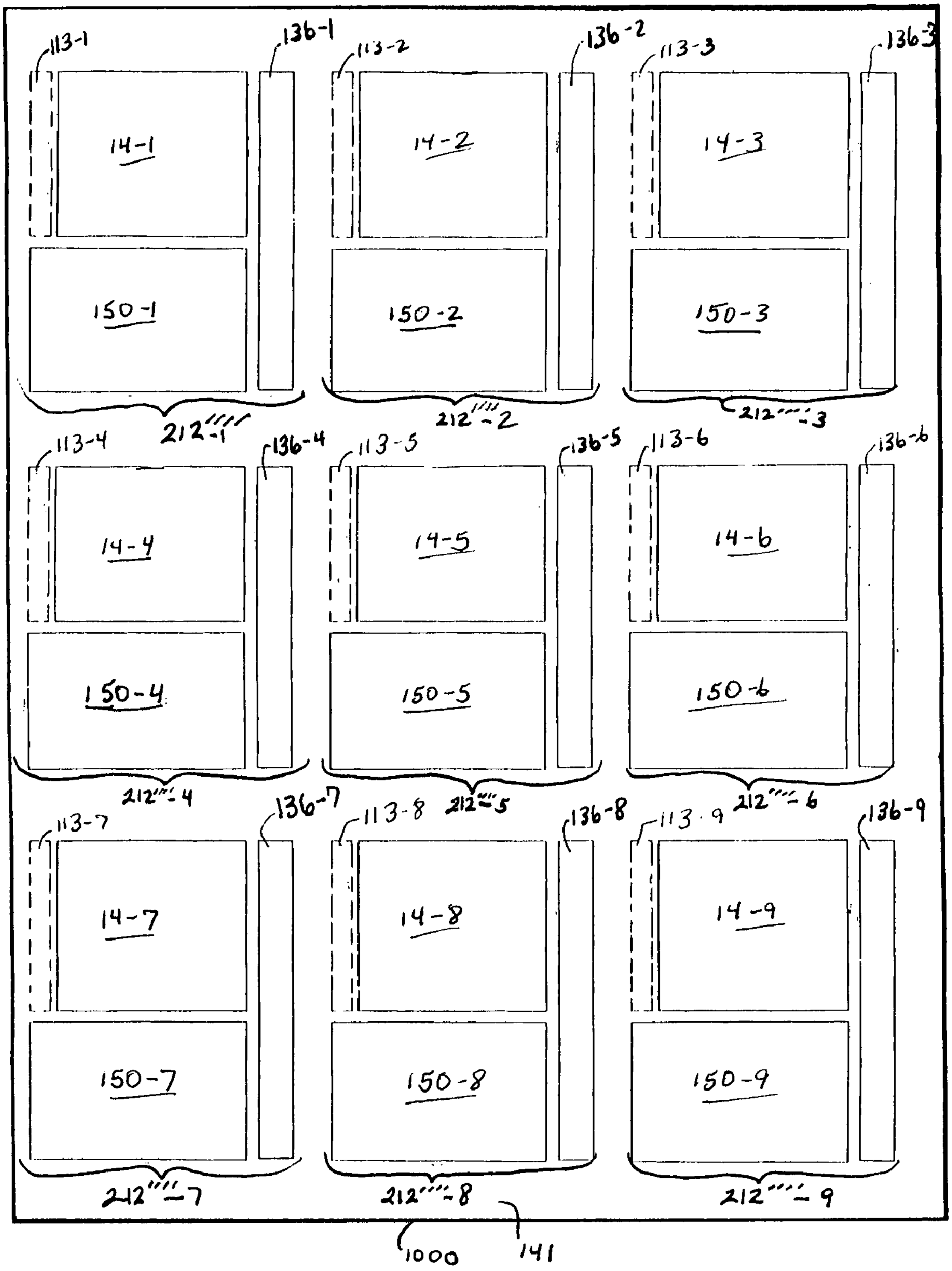
FIG. 18 is a plan view of a sheet of a plurality of a further alternative configuration of third exemplary computer printer printable self-adhesive label arrangement sets for use with a computer postage system in an exemplary embodiment of the present invention.

FIG. 18 is a plan view of a sheet 1000 of a plurality of exemplary label arrangement sets 212""-1 through 212""-9. Each exemplary label arrangement see, e.g., 212""-1, comprises: a postage indicia label, e.g., 14-1, that is adapted to be printed with postage indicia in landscape orientation; a first one-dimensional barcode label, e.g., 136-1, that is adapted to be printed with a first one-dimensional barcode representing either mailing identification information, such as a PLANET™ code, or delivery address information, such as a POSTNET code, in landscape orientation; and a return address label, e.g., 150-1, that is adapted to be printed with a return address, in portrait orientation. In each set, e.g., 212""-1, the return address label, e.g., 150-1, is provided below the corresponding postage indicia label, e.g., 14-1; the corresponding one-dimensional barcode label, e.g., 136-1, is provided to the right of the corresponding postage indicia label, e.g., 14-1, and corresponding return address label, e.g., 150-1.

Facsimile Reproduction of Copyright Material

A portion of the disclosure of this patent document contains material which is subject to copyright protection by the copyright owner, Stamps.com Inc., and its successors and assigns. The copyright owner has no objection to the facsimile reproduction by anyone of the patent document or the patent disclosure, as it appears in the Patent and Trademark Office patent file or records, but otherwise reserves all copyright rights whatsoever.

ILLUSTRATIVE EMBODIMENTS

Although this invention has been described in certain specific embodiments, many additional modifications and variations would be apparent to those skilled in the art. It is, therefore, to be understood that this invention may be practiced otherwise than as specifically described. Moreover, to those skilled in the various arts, the invention itself herein will suggest solutions to other tasks and adaptations for other applications. Thus, the embodiments of the invention described herein should be considered in all respects as illustrative and not restrictive, the scope of the invention to be determined by the appended claims and their equivalents rather than the foregoing description.

What is claimed is:

1. A sheet comprising a plurality of like-arranged computer printer printable self-adhesive label sets for use with a computer postage system, each of said computer printer printable self-adhesive label sets consisting of:

a first label on a layer of self-adhesive label stock, comprising a postage indicia label, wherein the postage indicia label is adapted to be printed with a printing consisting of postage indicia, the postage indicia label comprising a postage label height and a postage label length, wherein the postage label height is greater than the postage label length;

a second label on the layer of self-adhesive label stock, comprising a first one-dimensional barcode label, the first one-dimensional barcode label comprising a set of dimensions adapted for receiving a printing consisting of a first one-dimensional barcode representing a set of mailing identification information, the first one-dimensional barcode comprising a one-dimensional barcode length and a one-dimensional barcode height, the set of dimensions comprising a label length and a label height, the label length at least as long as the one-dimensional barcode length and the label height at least as high as the one-dimensional barcode height, wherein the label height is less than the postage label height, wherein the label height is less than the postage label length, wherein the label length is longer than the postage label length, and wherein the label length is longer than the postage label height; and a third label on the layer of self-adhesive label stock, comprising a second one-dimensional barcode label, the second one-dimensional barcode comprising the set of dimensions, and adapted for receiving a printing consisting of a second one-dimensional barcode representing a set of address information.

2. A sheet of computer printer printable self-adhesive label sets arranged on a top, self-adhesive layer of a sheet of self-adhesive label stock for use with a computer postage system, each computer printer printable self-adhesive label set consisting of:

a first label disposed on the top self-adhesive layer of the sheet of self-adhesive label stock, the first label consisting of a postage indicia label, wherein the postage indicia label is adapted to receive printing consisting of postage indicia, the postage indicia label comprising a postage indicia label height and a postage indicia label length, the postage indicia height being greater than the postage indicia label length;

a second label disposed on the top self-adhesive layer of the sheet of self-adhesive label stock, the second label consisting of a first barcode label, wherein the first barcode label is adapted to receive printing consisting of a first one-dimensional barcode representing mailing identification information, the first barcode label comprising a label length and a label height, the one-dimensional barcode comprising a one-dimensional barcode length and a one-dimensional barcode height, the label length exceeding the one-dimensional barcode length and the label height exceeding the one-dimensional barcode height, the label height being less than the postage indicia label height, the label height being less than the postage indicia label length, the label length being greater than the postage indicia label height, and the label length being greater than the postage indicia label length; and a third label disposed on the top self-adhesive layer of the sheet of self-adhesive label stock, the third label consisting of a second barcode label, wherein the second barcode label is adapted to receive printing consisting of a second barcode representing delivery address information, the second barcode label comprising the label height and the label length.

3. The sheet of computer printer printable self-adhesive label sets of claim 2, the label length measuring approximately 2.875 inches and the label height measuring approximately 0.3 inches.

4. The sheet of computer printer printable self-adhesive label set of claim 2, wherein:

the first label is disposed on an oblong sheet of self-adhesive label stock in a portrait orientation with respect to the oblong sheet and is adapted for receiving printing consisting of postage indicia in a portrait orientation with respect to the portrait orientation of the first label and the oblong sheet;

the second label is disposed on the oblong sheet in proximity to the first label, is disposed in a landscape orientation with respect to the oblong sheet and is adapted for receiving printing consisting of the first one-dimensional barcode in a landscape orientation with respect to the landscape orientation of the second label and of the oblong sheet; and the third label is disposed on the oblong sheet in proximity to the second label, is disposed in a landscape orientation with respect to the oblong sheet and is adapted for receiving printing consisting of the second one-dimensional barcode in a landscape orientation with respect to the landscape orientation of the third label and of the oblong sheet.

5. A sheet of a plurality of computer printer printable self-adhesive label sets for use with a computer postage system, each computer printer printable self-adhesive label set of the plurality of computer printer printable self-adhesive label sets comprising:

a first label arranged in a portrait orientation with respect to the sheet, the first label comprising a postage indicia label, wherein the postage indicia label is adapted to be printed with postage indicia according to postage indicia requirements in portrait orientation with respect to the sheet, the postage indicia label being adapted to be printed with a printing consisting of postage indicia, the postage indicia label comprising a postage label height and a postage label length, wherein the postage label height is greater than the postage label length; and a second label arranged in a landscape orientation with respect to the sheet and with respect to the first label, the second label comprising a first one-dimensional barcode label, the first one-dimensional barcode label being adapted to be printed with a printing consisting of a one-dimensional barcode according to one-dimensional barcode requirements in landscape orientation with respect to the sheet, the first one-dimensional barcode label comprising a label length and a label height, the one-dimensional barcode comprising a one-dimensional barcode length and a one-dimensional barcode height, the label length exceeding the one-dimensional barcode length and the label height exceeding the one-dimensional barcode height, the label height being less than the postage indicia label height, the label height being less than the postage indicia label length, the label length being greater than the postage indicia label height, and the label length being greater than the postage indicia label length;

wherein the sheet comprises a top self-adhesive layer backed by a backing layer;

wherein each computer printer printable self-adhesive label set is arranged on the top layer of self-adhesive label stock in proximity to at least one other computer printer printable self-adhesive label set.

6. The sheet of a plurality of computer printer printable self-adhesive label sets for use with a computer postage system of claim 5, each computer printer printable self-adhesive label set of the plurality of computer printer printable self-adhesive label sets further comprising:

a third label on the layer of self-adhesive label stock, comprising a second one-dimensional barcode label, the second one-dimensional barcode comprising the set of dimensions, and being adapted to be printed with a printing consisting of a second one-dimensional barcode according to one-dimensional barcode requirements representing a set of address information.

7. A sheet of a plurality of computer printer printable self-adhesive label sets for use with a computer postage system, the sheet comprising a sheet height and a sheet width, wherein the sheet height is greater than the sheet width, each computer printer printable self-adhesive label set arranged on a top self-adhesive layer of a sheet of self-adhesive label stock, each computer printer printable self-adhesive label set comprising:

a first label comprising a postage indicia label, the first label comprising a first label height and a first label width, wherein the first label height is greater than the first label width, wherein the postage indicia label is adapted to be printed with postage indicia according to postage indicia requirements, the first label being adapted to be printed with postage indicia in portrait orientation with respect to the first label;

a second label comprising a first barcode label, the second label comprising a second label height and a second label width, wherein the second label width is greater than the second label height, wherein the first barcode label is adapted to be printed with a printing consisting of a first one-dimensional barcode representing mailing identification information according to one-dimensional barcode requirements, the first barcode label being arranged on the sheet in a landscape orientation with respect to the first label, the one-dimensional barcode comprising a one-dimensional barcode length and a one-dimensional barcode height, the second label length exceeding the one-dimensional barcode length and the second label height exceeding the one-dimensional barcode height, the second label height being less than the first label height, the second label height being less than the first label length, the second label length being greater than the first label height, and the second label length being greater than the first label length.

8. The sheet of a plurality of computer printer printable self-adhesive label sets of claim 7, wherein the first label of each computer printer printable self-adhesive label set is disposed in a portrait orientation with respect to a portrait orientation of the sheet so that the first label width is parallel to the sheet width, and wherein the barcode label is disposed in a landscape orientation with respect to the first label so that the second label width is parallel to the sheet width.

9. The sheet of a plurality of computer printer printable self-adhesive label sets of claim 7, wherein the first label of each computer printer printable self-adhesive label set is disposed in a portrait orientation with respect to a landscape orientation of the sheet so that the first label width is parallel to the sheet height, and wherein the first barcode label is disposed in a landscape orientation with respect to the first label so that the second label width is parallel to the sheet height.

10. The sheet of a plurality of computer printer printable self-adhesive label sets of claim 9, each computer printer printable self-adhesive label set further comprising:

a third label comprising a second barcode label, the third label comprising a third label height and a third label width, wherein the third label width is greater than the third label height, wherein the second barcode label is adapted to be printed with a printing consisting of a second one-dimensional barcode representing delivery address information, the second barcode label being arranged on the sheet in a landscape orientation with respect to the first label and parallel to the first barcode label.

11. A method using a computer device for printing postage indicia and mail piece tracking information onto a single sheet of self-adhesive labels containing a plurality of self-adhesive label arrangement sets, the method comprising:

using the computer device, generate postage indicia according to a set of postage indicia requirements in a postage indicia format for printing on a rectangular postage indicia label of a first self-adhesive label arrangement set of the plurality of self-adhesive label arrangement sets, said postage indicia format comprising a portrait orientation of the postage indicia with respect to the rectangular postage indicia label, and further comprising a border spacing for the postage indicia from a perimeter of the rectangular postage indicia label, the rectangular postage indicia label being adapted to be printed with a printing consisting of postage indicia, the rectangular postage indicia label comprising a postage indicia label height and a postage indicia label length, wherein the postage indicia label height is greater than the postage indicia label length;

using the computer device, generate a first one-dimensional barcode representing mail piece tracking information according to a first set of one-dimensional barcode requirements in a first one-dimensional barcode format for printing on a first rectangular barcode label of the first self-adhesive label arrangement set, said first one-dimensional barcode format comprising a landscape orientation of the first one-dimensional barcode with respect to the first rectangular barcode label, said first rectangular barcode format in said landscape orientation comprising a one-hundred-eighty degree rotation with respect to the portrait orientation of the postage indicia format, and, said first one-dimensional barcode format further comprising a border spacing for the first one-dimensional barcode from a perimeter of the first rectangular barcode label, the first rectangular barcode label adapted for receiving printing consisting of a one-dimensional barcode, the first one-dimensional barcode comprising a one-dimensional barcode length and a one-dimensional barcode height, the first rectangular barcode label comprising a barcode label length and a barcode label height, the barcode label length exceeding the one-dimensional barcode length and the barcode label height exceeding the one-dimensional barcode height, the barcode label height being less than the postage indicia label height, the barcode label height being less than the postage indicia label length, the barcode label length being greater than the postage indicia label height, and the barcode label length being greater than the postage indicia label length; and using the computer device, facilitate printing the postage indicia, according to the postage indicia format, in said portrait orientation on the rectangular postage indicia label, and facilitate printing the first one-dimensional barcode, according to the first one-dimensional barcode format, in said landscape orientation in the one-hundred-eighty degree rotation with respect to the postage indicia on the first rectangular barcode label.

12. The method of claim 11, wherein using the computer device to generate postage indicia comprises instructing the computer device to format postage indicia in a portrait orientation with respect to the single sheet for printing on the rectangular postage indicia label that is disposed on the single sheet in a portrait orientation with respect to a portrait orientation of the single sheet, and wherein using the computer device to generate one-dimensional barcode comprises instructing the computer device to format the one-dimensional barcode in a landscape orientation with respect to the single sheet for printing on the rectangular barcode label that is disposed on the single sheet in a landscape orientation with respect to the landscape orientation of the single sheet.

13. The method of claim 11, wherein using the computer device to generate postage indicia comprises instructing the computer device to format postage indicia for printing on the rectangular postage indicia label that is disposed on the single sheet in a portrait orientation with respect to a landscape orientation of the single sheet.

14. A method using a computer device for printing postage indicia and mailing tracking information onto a particular label arrangement set on a single sheet of self-adhesive labels, wherein the single sheet of self-adhesive labels comprises a plurality of label arrangement sets, and wherein each label arrangement set comprises a plurality of labels, the method comprising:

using the computer device, generate postage indicia according to a set of postage indicia requirements in a postage indicia format for printing on a first oblong label of a particular label arrangement set, said postage indicia format comprising a portrait orientation of the postage indicia with respect to the first oblong label, and further comprising a border spacing for the postage indicia from a perimeter of the first oblong label, the first oblong label of the particular label arrangement set being adapted to be printed with a printing consisting of computer-based postage indicia, the first oblong label comprising a postage indicia label height and a indicia postage label length, wherein the postage indicia label height is greater than the postage indicia label length;

using the computer device, generate a first graphic symbology representing mail piece tracking information according to a set of graphic symbology requirements in a first graphic symbology format for printing on a second oblong label of the particular label arrangement set, said first graphic symbology format comprising a landscape orientation of the first graphic symbology with respect to the first oblong label, said first graphic symbology format in said landscape orientation comprising a one-hundred-eighty degree rotation with respect to the portrait orientation of the postage indicia format, and said first graphic symbology format further comprising a spacing for the first graphic symbology from a perimeter of the second oblong label, the second oblong label being adapted for receiving printing consisting of a graphic symbology; and using the computer device, facilitate printing the postage indicia, according to the postage indicia format, in said portrait orientation on the first oblong label, and facilitate printing the first graphic symbology, according to the first graphic symbology format, in said landscape orientation in the one-hundred-eighty degree rotation with respect to the postage indicia on the second oblong label.

15. The method of claim 14, wherein the first oblong label is disposed on the single sheet in a portrait orientation with respect to a portrait orientation of the single sheet, wherein using the computer device, generate postage indicia in a postage indicia format for printing on the first oblong label in a portrait orientation with respect to the first oblong label, comprises using the computer device, generate postage indicia in a postage indicia format for printing on the first oblong label in the portrait orientation with respect to the single sheet, and wherein the second oblong label is disposed on the single sheet in a landscape orientation with respect to a landscape orientation of the single sheet, and wherein using the computer device, generate the first graphic symbology in a first graphic symbology format for printing on the second oblong label comprises using the computer device, generate the first graphic symbology in a first graphic symbology format for printing on the second oblong label in the landscape orientation with respect to the single sheet.

16. The method of claim 14, wherein the first oblong label is disposed on the single sheet in a portrait orientation with respect to a landscape orientation of the single sheet, wherein using the computer device, generate postage indicia in a postage indicia format for printing on the first oblong label in a portrait orientation with respect to the first oblong label, comprises using the computer device, generate postage indicia in a postage indicia format for printing on the first oblong label in portrait orientation with respect to the first oblong label with respect to the landscape orientation of the single sheet, and wherein the second oblong label is disposed on the single sheet in a portrait orientation with respect to the single sheet, and wherein using the computer device, generate the first graphic symbology in a first graphic symbology format for printing on the second oblong label comprises using the computer device, generate the first graphic symbology in a first graphic symbology format for printing on the second oblong label in a portrait orientation with respect to the single sheet.

17. The method of claim 14 for printing postage indicia and mailing tracking information onto a particular label arrangement set on a single sheet of self-adhesive labels, the method further comprising:

using the computer device, generate a second graphic symbology representing delivery address information in a second graphic symbology format for printing on a third oblong label of the particular label arrangement set, said second graphic symbology format comprising a landscape orientation of the second graphic symbology with respect to the third oblong label, said second graphic symbology format in said landscape orientation comprising a one-hundred-eighty degree rotation with respect to the portrait orientation of the postage indicia format, wherein the third oblong label of the particular label arrangement set is adapted to be printed with a printing consisting of the second graphic symbology according to the set of graphic symbology requirements.

18. A sheet comprising a plurality of like-arranged computer printer printable self-adhesive label sets for use with a computer postage system, each of said computer printer printable self-adhesive label sets consisting of:

a first label on a layer of self-adhesive label stock, comprising a postage indicia label, wherein the postage indicia label is adapted to be printed with a printing consisting of postage indicia, the postage indicia label comprising a postage label height and a postage label length, wherein the postage label height is greater than the postage label length;

a second label on the layer of self-adhesive label stock, comprising a first one-dimensional barcode label, the first one-dimensional barcode label comprising a set of dimensions adapted for receiving a printing consisting of a first one-dimensional barcode representing a set of mailing identification information, the first one-dimensional barcode comprising a one-dimensional barcode length and a one-dimensional barcode height, the set of dimensions comprising a label length and a label height, the label length at least as long as the one-dimensional barcode length and the label height at least as high as the one-dimensional barcode height, wherein the label height is less than the postage label height, wherein the label height is less than the postage label length, wherein the label length is longer than the postage label length, and wherein the label length is longer than the postage label height.

19. A method using a computer device for printing postage indicia and mailing tracking information onto a particular label arrangement set on a single sheet of self-adhesive labels, wherein the single sheet of self-adhesive labels comprises a plurality of label arrangement sets, and wherein each label arrangement set comprises a plurality of labels, the method comprising:

using the computer device, generate postage indicia according to a set of postage indicia requirements in a postage indicia format for printing on a first label of a particular label arrangement set on the single sheet of self-adhesive labels;

using the computer device, generate a first graphic symbology representing mail piece tracking information according to a set of graphic symbology requirements in a first graphic symbology format for printing on a second label of the particular label arrangement set, said first graphic symbology format comprising a one-hundred-eighty degree rotation with respect to the postage indicia format; and using the computer device, facilitate printing the postage indicia, according to the postage indicia format, on the first label, and facilitate printing the first graphic symbology, according to the first graphic symbology format, in said one-hundred-eighty degree rotation with respect to the postage indicia, on the second label.

* * * * *